US012231733B2

(12) United States Patent
Michurin

(10) Patent No.: US 12,231,733 B2
(45) Date of Patent: Feb. 18, 2025

(54) AUTOMATED GENERATION OF STRUCTURED FEEDBACK FOR MEDIA CREATOR

(71) Applicant: Microsoft Technology Licensing, LLC, Redmond, WA (US)

(72) Inventor: Yury Michurin, Pleasant Hill, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/295,449

(22) Filed: Apr. 4, 2023

(65) Prior Publication Data

US 2024/0340502 A1 Oct. 10, 2024

(51) Int. Cl.
*H04N 21/475* (2011.01)
*H04N 21/432* (2011.01)
*H04N 21/8547* (2011.01)

(52) U.S. Cl.
CPC ....... *H04N 21/475* (2013.01); *H04N 21/4325* (2013.01); *H04N 21/8547* (2013.01)

(58) Field of Classification Search
CPC ............. H04N 21/475; H04N 21/4325; H04N 21/8547
See application file for complete search history.

(56) References Cited

U.S. PATENT DOCUMENTS

| | | | | |
|---|---|---|---|---|
| 9,342,516 | B2 | 5/2016 | Matthews et al. | |
| 2010/0169906 | A1 | 7/2010 | Takahashi | |
| 2016/0247537 | A1* | 8/2016 | Ricciardi | G06V 20/42 |
| 2021/0357447 | A1* | 11/2021 | Mckenzie | G11B 27/34 |

* cited by examiner

*Primary Examiner* — Yassin Alata

(74) *Attorney, Agent, or Firm* — NICHOLSON DE VOS WEBSTER & ELLIOTT, LLP

(57) ABSTRACT

Embodiments create a structured representation of user feedback received from a media player, where the user feedback relates to a media item played by the media player or a particular segment of a media item played by the media player. A device may receive a first selection signal from a first media player of a first user device. A device may, based on the first selection signal, determine first timestamp data, where the first timestamp data is associated with a first segment of a media item played by the first media player. A device may receive first user feedback from the first media player. A device may, based on the first timestamp data, create a first structured representation of the first user feedback, where the first structured representation includes a first feedback category. A device may create and store a first data record that includes the first feedback category.

20 Claims, 10 Drawing Sheets

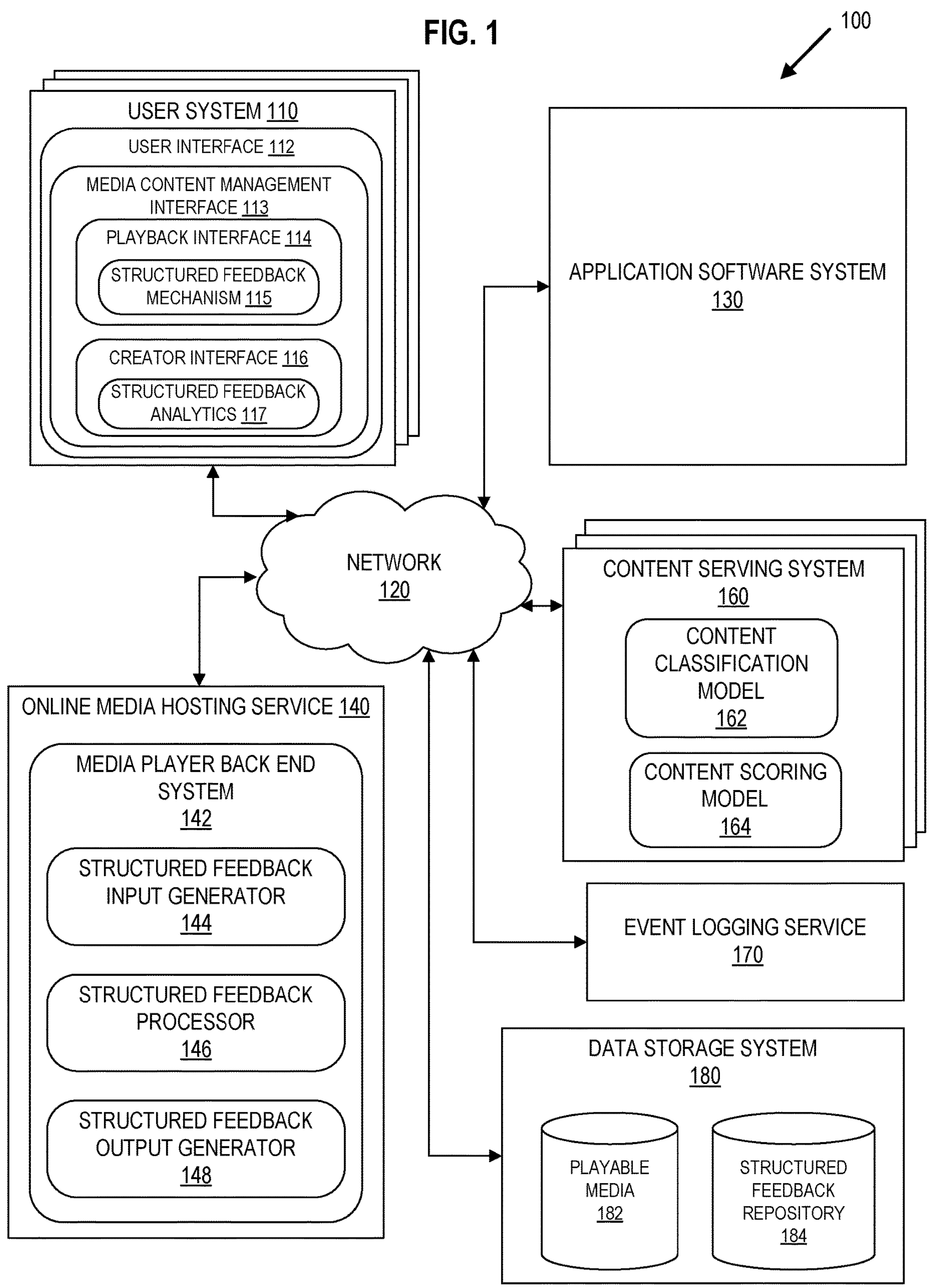
FIG. 1
100
USER SYSTEM 110
USER INTERFACE 112
MEDIA CONTENT MANAGEMENT INTERFACE 113
PLAYBACK INTERFACE 114
STRUCTURED FEEDBACK MECHANISM 115
CREATOR INTERFACE 116
STRUCTURED FEEDBACK ANALYTICS 117
APPLICATION SOFTWARE SYSTEM 130
NETWORK 120
CONTENT SERVING SYSTEM 160
CONTENT CLASSIFICATION MODEL 162
CONTENT SCORING MODEL 164
ONLINE MEDIA HOSTING SERVICE 140
MEDIA PLAYER BACK END SYSTEM 142
STRUCTURED FEEDBACK INPUT GENERATOR 144
STRUCTURED FEEDBACK PROCESSOR 146
STRUCTURED FEEDBACK OUTPUT GENERATOR 148
EVENT LOGGING SERVICE 170
DATA STORAGE SYSTEM 180
PLAYABLE MEDIA 182
STRUCTURED FEEDBACK REPOSITORY 184

350

0:45 / 1:21

352 356 354

AUTOMATED GENERATION OF STRUCTURED FEEDBACK FOR MEDIA CREATOR

TECHNICAL FIELD

A technical field to which the present disclosure relates is feedback mechanisms for digital media creators. Another technical field to which the present disclosure relates is asynchronous online learning.

COPYRIGHT NOTICE

This patent document, including the accompanying drawings, contains material that is subject to copyright protection. The copyright owner has no objection to the facsimile reproduction of this patent document, as it appears in the publicly accessible records of the United States Patent and Trademark Office, for the purpose of viewing its content, but otherwise reserves all copyright rights whatsoever.

BACKGROUND

Software applications can use computer networks to distribute digital content among computing devices on a very large scale. Online software applications can regularly receive millions of content uploads and distribute uploaded content items to tens or even hundreds of millions of user devices worldwide. The content items distributed by online software applications include images, audio, video, and other forms of multimedia content.

A media playing service is a type of application software that plays multimedia computer files such as audio files and/or video files. Media playing services are designed to play back live or pre-recorded multimedia content using streaming technologies or traditional playback technologies. Examples of media playing services include video players, audio players, live streaming software, and podcast software.

Media playing services can be used to facilitate asynchronous and/or synchronous online learning. Asynchronous online learning includes forms of education, instruction, and learning that enable participants to view previously recorded multimedia materials at any time they choose but without any live interactions with the instructors. With synchronous online learning, students participate in live video classes at specific scheduled times and interact with the instructors through the live video.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing system 100 that includes a structured feedback generation system in accordance with some embodiments of the present disclosure.

DETAILED DESCRIPTION

Figure 2A:
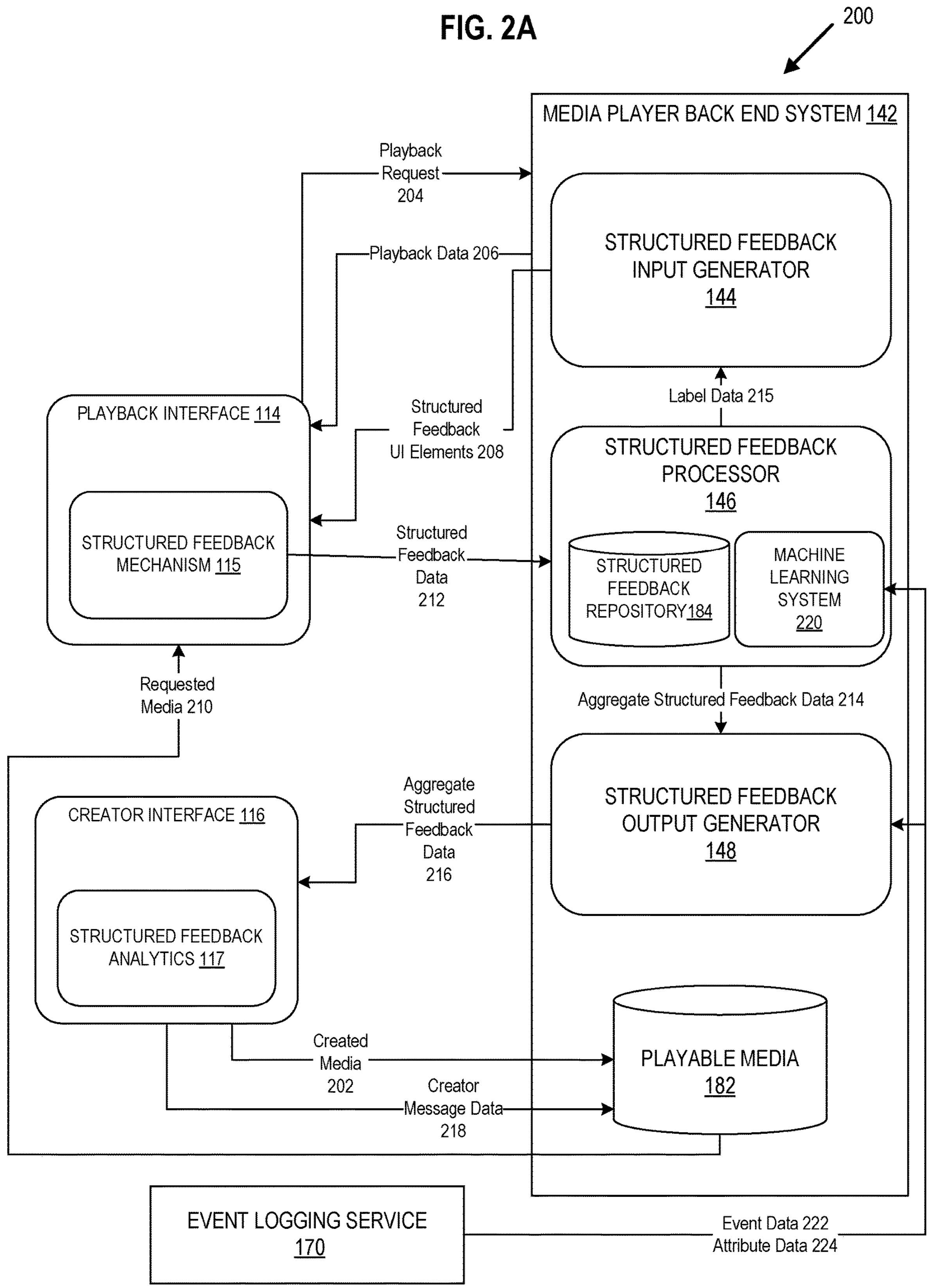
FIG. 2A is a flow diagram of an example method 200 for generating and processing structured feedback in accordance with some embodiments of the present disclosure.

A media playing service includes software can be downloaded, stored, and run locally on end user devices or hosted on a network, such as the Internet, by an online hosting service. In hosted implementations, end users view and play back multimedia files through a front end portion of the media playing service, which is loaded onto their end user devices or implemented in a web browser or mobile app, for example.

A back end portion of the media playing service is hosted on a server. The back end portion manages the delivery of multimedia files to the front end portion of the media playing service. When an end user requests playback of a multimedia item, the back end assembles a package that contains the requested multimedia file, or a link to the requested multimedia file, for delivery to the front end at the requesting user's device. Multimedia file, multimedia item, multimedia package, multimedia content, media item, and similar terminology may be used herein to refer to a playable package that includes one or more multimedia files.

In streaming applications, the back end manages the streaming of the multimedia file to the end user's device in segments, and the front end of the media playing service plays the segments of the multimedia file as they are streamed and received at the end user's device. In non-streaming applications, the back end manages the download of the multimedia file to the end user's device and the front end of the media playing service does not begin playing the file until after all of the segments of the file have been completely downloaded. A segment of a multimedia file includes, for example, a temporal sequence of one or more frames of a video, one or more groups of pixels within an image, or one or more pages of a document.

In hosted implementations, the creator of a multimedia file publishes the multimedia file for viewing by other users by uploading the file to an online hosting service, such as for mass consumption. The online hosting service adds the published multimedia file to a searchable repository of multimedia files and displays a selectable link to the published multimedia file on a landing page such as an online video portal. After the multimedia file is published, any user who has access to the online portal can view and play back the multimedia file. As a result, many published multimedia files receive hundreds, thousands, or even millions of views through online portals.

Some conventional media playing services include a comment feature that allows viewing users to create free text comments during the playback of multimedia files. However, these comment mechanisms are unregulated and unorganized. For example, any viewing user can add any number of comments and any of the comments could pertain to, or be completely unrelated to, the multimedia file being played.

The creators of multimedia files often desire feedback from viewers of their content, but conventional media playing services struggle to provide meaningful feedback to creators in an effective way. This is particularly true in asynchronous settings that do not permit live interaction between the creator and viewers of the creator's work. For instance, in the context of asynchronous online learning, a creator of an educational video published to an online learning portal might like to know, after the video is published, which, if any, segments of the published video may need revision because those segments are unclear to particular users or user groups, have become outdated, or contain inadvertent errors.

However, the conventional implementations of video commenting mechanisms are impractical for creators to receive, process, and respond to comments in an effective and timely manner. This is because the prior commenting mechanisms do not provide creators with any way to organize the comments or to quickly identify and extract the most relevant or constructive information from among a large number of comments. Additionally, the prior commenting mechanisms do not allow viewing users to categorize the comments that they submit.

This disclosure provides technical solutions to the above-described challenges and other shortcomings of conventional media playing services. In contrast to prior approaches, aspects of the disclosed technologies provide a structured feedback mechanism that generates structured feedback based on input submitted by viewing users during asynchronous playback of a multimedia file. The disclosed technologies can link auto-generated structured feedback with specific timestamped segments of the played multimedia file if desired.

Structured feedback as used herein may refer to a structured representation of user input such as feedback from a user viewing a media item via a media playing service. For example, structured feedback may refer to structured data, e.g., data that is in a standardized format, for example, according to a data model, database schema, taxonomy, or vocabulary. For instance, structured feedback can include a label that represents a certain type or category of feedback, such as question, opinion, error correction, or request for clarification. Alternatively or in addition, structured feedback can include a standardized representation of feedback such as a named entity, such as a word, phrase, or hashtag that summarizes the semantic content of the viewing user's input.

Examples of viewing user input include natural language (e.g., spoken-language audio or written text) comments or questions and mouse clicks or touchscreen taps and graphical user interface (GUI) elements. Examples of structured feedback that can be automatically generated using the disclosed technologies include labels, where the labels are generated based on or assigned to the viewing user input based, for example, the playback time associated with the viewing user input.

Aspects of the disclosed technologies facilitate the generation of structured feedback based on input received from viewing users during asynchronous playback of multimedia files. Other aspects organize the structured feedback generated based on the input received from viewing users for efficient and actionable consumption by the multimedia file creators. For example, the disclosed technologies can aggregate the structured feedback by timestamp, feedback category, user, user group, or other criteria. Still other aspects of the disclosed technologies enable creators to generate responses to asynchronously received input from viewing users and incorporate those responses into the applicable multimedia package for subsequent distribution to the viewing users through the online portal.

Aspects of the disclosed technologies are described in the context of online systems including network-based digital content distribution systems. An example of a content distribution use case is an online learning service or education portal. Another example of a content distribution use case is the distribution of user-generated content such as video, audio, or other forms of multimedia content through a social network service or a messaging service. Another example of a content distribution use case is the distribution of video- or audio-based digital advertisements and recommendations for products and/or services, such as infomercials, through an online system.

However, aspects of the disclosed technologies are not limited to online learning, education, ads or recommendations distribution, or to social media applications, but can be used to improve media playing services for other applications. Further, any network-based application software system can act as a content distribution system. For example, news, entertainment, and e-commerce apps installed on mobile devices, enterprise systems, messaging systems, and social graph-based applications can all function as content distribution systems.

The disclosure will be understood more fully from the detailed description given below and from the accompanying drawings of various embodiments of the disclosure. The drawings, however, should not be taken to limit the disclosure to the specific embodiments, but are for explanation and understanding only.

Figures 3A, 3B:
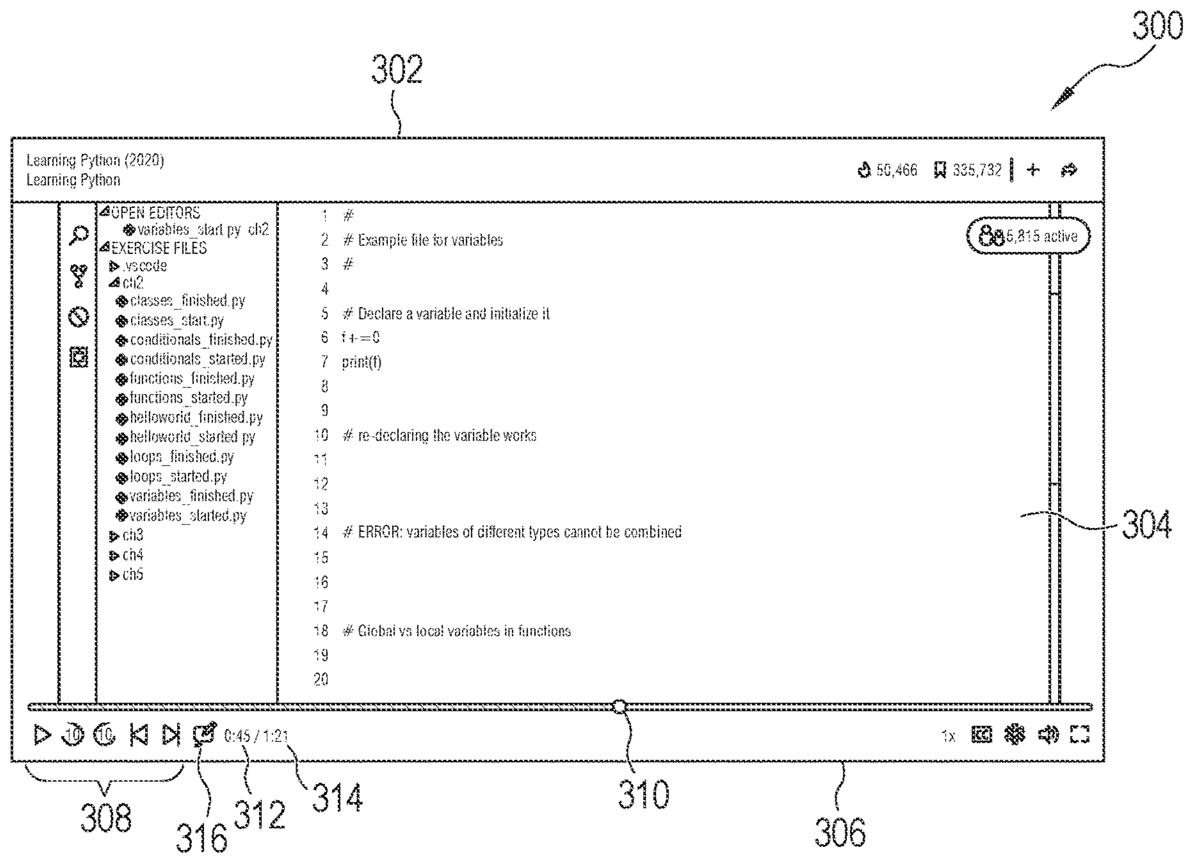
FIG. 3A is an example implementation of a media playing service 300 including a structured feedback mechanism in accordance with some embodiments of the present disclosure.
FIG. 3B is an example implementation of a structured feedback mechanism 350 in accordance with some embodiments of the present disclosure.

FIG. 3A is an example implementation of a media playing system 300 including a structured feedback mechanism in accordance with some embodiments of the present disclosure.

The media playing system 300 is implemented as a graphical user interface that includes a skin 302, a media playback window 304, a control panel 306, a set of playback controls 308, a playback time progress marker 310, an elapsed playback time counter 312, a total playback time counter 314, and a structured feedback control element 316. In the example of FIG. 3A, a learning video about the programming language Python is shown being played in the media playback window 304. The set of playback controls 308 includes interactive GUI control elements such as a play button, rewind buttons, and forward buttons.

The playback time progress marker 310 is an interactive GUI control element that can be moved to advance or rewind the playback. The position of the marker 310 corresponds to the value of the elapsed playback time counter 312. Thus, movement of the marker 310 adjusts the value of the elapsed playback time counter 312. The value of the total playback time counter 314 is stored with the media item being played, e.g., as metadata, and is retrieved when the media item is retrieved for playback. The media playing system 300 starts the elapsed playback time counter 312 when the playback of the media item begins. For example, if playback starts at the first frame of the media item, the elapsed playback time counter 312 is initialized to zero and counts upward in seconds as the playback continues.

The structured feedback control element 316 is an interactive GUI control element that can receive selection signals such as mouse clicks or taps issued by the viewing user through, e.g., user interface 112. When the structured feedback control element 316 receives a selection signal, the media playing system 300 is capable of receiving feedback from the user on the segment of the media item that is associated with the value of the elapsed playback time counter 312 at the time the selection signal is received, as described in more detail below. In some implementations, the playback of the media item pauses or stops automatically when the structured feedback control element 316 receives a selection signal. In other implementations, the viewing user stops or pauses the playback, e.g., by selecting one of the playback controls 308, before selecting the structured feedback control element 316.

The positioning of the structured feedback control element 316 can be configured to convey to the user that the submission of user input via selection of the aggregate structured feedback data 216 can be specific to the particular segment of the media item being viewed when the structured feedback control element 316 is selected. For example, in the implementation of FIG. 3A, the structured feedback control element 316 is positioned adjacent to the elapsed playback time counter 312 on the control panel 306, such that the user can easily see the elapsed playback time and the structured feedback control element 316 in the same view. In other implementations, the positioning of the structured feedback control element 316 on the user interface is based on other considerations; that is, the structured feedback control element 316 could be placed in any suitable location of the user interface.

FIG. 3B is an example implementation of a structured feedback mechanism 350 in accordance with some embodiments of the present disclosure. FIG. 3B shows another implementation of a structured feedback mechanism. The elements of structured feedback mechanism 350 function in a similar way as the corresponding elements shown in FIG. 3A, described above. In FIG. 3B, the structured feedback mechanism includes an elapsed playback time counter 352, a total playback time counter 354, and a structured feedback control element 356 positioned between an elapsed playback time counter 352 and a total playback time counter 354. The structured feedback mechanism 350 can be positioned on the control bar, e.g., control panel 306, or overlay a portion of the playback window 304, for example. In some implementations, the structured feedback mechanism 350 is a separate widget that the user can relocate to any position on the media player, e.g., media playing system 300. Although not specifically shown in the drawings, in various implementations, one or more elements shown in FIG. 3A can be used in combination with aspects shown in FIG. 3B, and one or more elements shown in FIG. 3B can be used in combination with aspects shown in FIG. 3A.

Figure 4A:
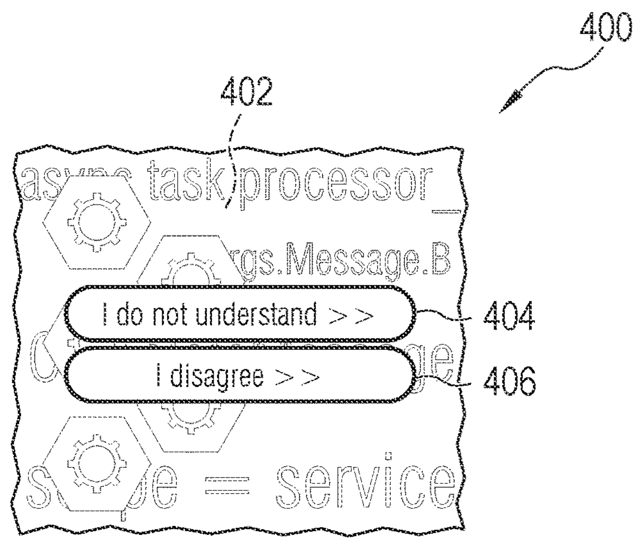
FIG. 4A is an example implementation of a structured feedback mechanism 400 in accordance with some embodiments of the present disclosure.

FIG. 4A is an example implementation of a structured feedback mechanism 400 in accordance with some embodiments of the present disclosure. Portions of the media player that supports the structured feedback mechanism 400 are omitted from FIG. 4A. The structured feedback mechanism 400 includes user interface control elements 404, 406, which are presented after a structured feedback selection signal has been received by, e.g., structured feedback control element 316 or 356. For example, while the media playing system 300 is playing a segment 402 of a multimedia file, the viewing user selects structured feedback control element 316. In response to the structured feedback control element 316 receiving a selection signal, the user interface control elements 404, 406 are displayed. In the implementation of FIG. 4A, the control elements 404, 406 overlay a portion of the segment of the media item being played at the time the selection signal is received.

The control elements 404, 406 each correspond to a different, particular category of feedback. For example, control element 404 corresponds to a "clarity" or "I do not understand" feedback category while control element 406 corresponds to an "opinion" or "I disagree" feedback category. In the structured feedback mechanism 400, one but not both of the presented control elements 404, 406 can be selected, e.g., control elements 404, 406 are alternatively selectable. For instance, if the viewing user selects control element 404, the user will not also be able to select control element 406, e.g., control element 406 will be disabled or deactivated. Likewise, if the viewing user selects control element 406, the user will not also be able to select control element 404, e.g., the control element 404 will be disabled or deactivated.

In some implementations, for example as shown in FIG. 4A, the user can only choose one of the available categories since the categories are mutually exclusive (e.g., "do not understand" vs "disagree"), where the mutually exclusive categories are pre-defined high-level categorizations of user feedback. When the user selects one of the mutually exclusive categories, the structured feedback mechanism 400 prompts the user to input unstructured free form text as shown, for example, in FIG. 4B, described below. Subsequent to selecting one of the mutually exclusive categories or in other implementations that do not use mutually exclusive categories, the structured feedback mechanism 400 auto-generates and displays suggested keywords or hashtags that can be used as structured feedback, and the user can select any one or more of the machine-suggested keywords or hashtags for inclusion in the user's unstructured natural language feedback (e.g., freeform comments). Once a suggested keyword hashtag is selected by the user for inclusion in the user's feedback, the selected hashtag is used by the structured feedback mechanism 400 to categorize the user's unstructured text input; i.e., to create structured feedback that represents the user's unstructured input. Unlike the selectable categories described above, the user-selectable machine-generated suggested hashtags are not mutually exclusive. For example, the user can select any number of suggested keywords or hashtags from the predefined list of suggested keywords hashtags and/or the user can input their own keywords or hashtags, and the structured feedback mechanism 400 uses the keywords or hashtags received via user input and/or user selection to formulate a structured representation of the user's unstructured feedback.

In some implementations, selection of one of the alternatively selectable control elements 404, 406 logs the feedback category associated with the selected control element to a database, e.g., structured feedback repository 184. For example, if control element 404 receives a selection signal, a data record is created that contains a source identifier associated with the viewing user, a media identifier associated with the media item being viewed, a feedback category identifier associated with the "I do not understand" feedback category, and a timestamp that corresponds to the value of the elapsed playback time counter and the segment being played at the time the selection signal is received.

Figure 4B:
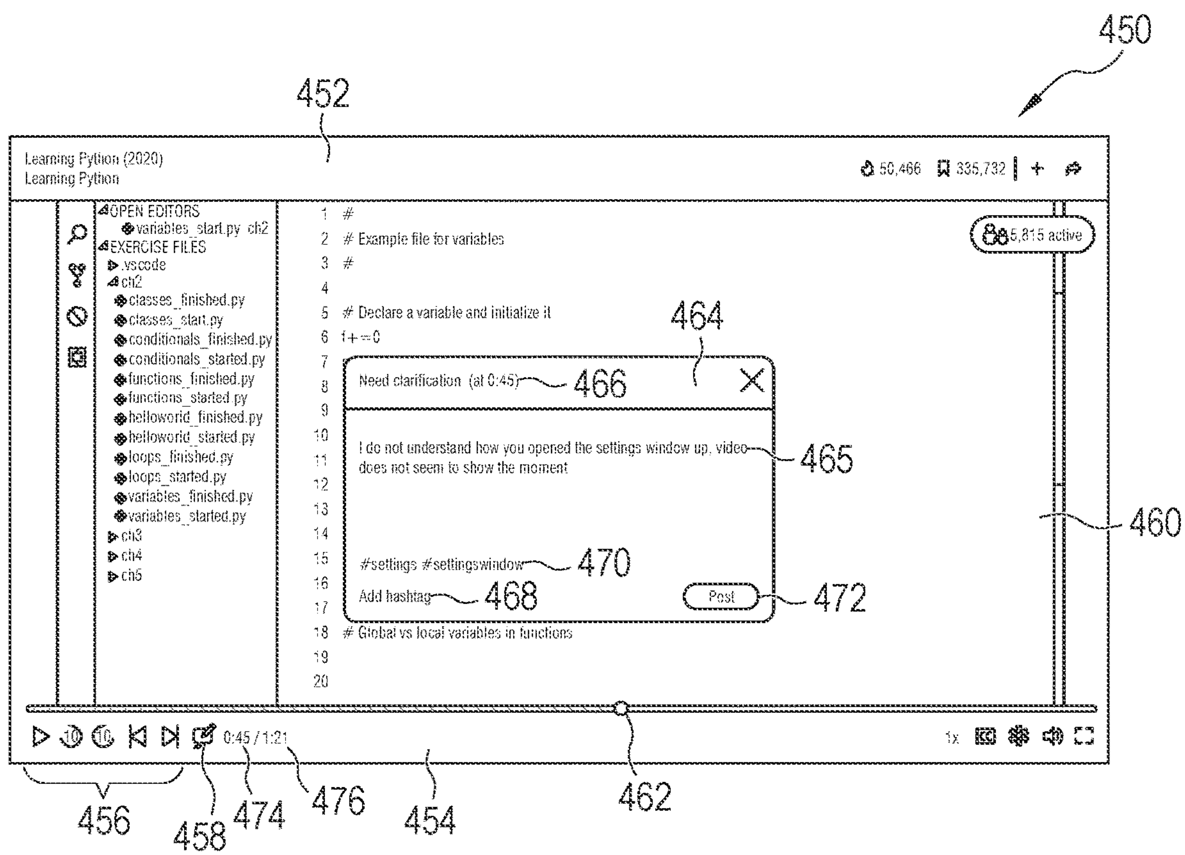
FIG. 4B is an example implementation of a media playing service 450 in accordance with some embodiments of the present disclosure.

In other implementations, selection of the alternatively selectable control elements 404, 406 logs the feedback category associated with the selected control element and generates another structured feedback UI control element that enables the user to provide additional feedback details. An example of a feedback UI control element that is presented upon selection of an alternatively selectable control element, e.g., one of elements 404, 406, is shown in FIG. 4B, described below. While the structured feedback mechanism 400 contains only two alternative control elements 404, 406, other implementations can contain two or more alterative control elements in accordance with the requirements of a particular application and subject to design constraints of the user interface.

FIG. 4B is an example implementation of a media player 450 in accordance with some embodiments of the present disclosure. The media player 450 includes a skin 452, a control bar 454, a set of playback control elements 456, a structured feedback control element 458, a playback window 460, a playback progress marker 462, and a feedback input element 464.

Structured feedback input element (e.g., text input box) 464 includes a feedback label 466, a text input area 465, a hashtag input control element 468, at least one suggested hashtag 470, and a post button 472. The feedback label 466 indicates a particular feedback category and a timestamp that matches the elapsed playback time for the segment of the media item displayed in the playback window 460. The text input area 465 can receive text submitted by the viewing user e.g. through a keyboard, keypad, or speech to text mechanism. For example, the text input area 465 receives detailed user-submitted comments relating to the feedback label 466

The suggested hashtag(s) 470 are generated by, e.g., machine learning system 220, using any one or more of the techniques described herein. The suggested hashtags 470 are control elements that can receive selection signals. If a suggested hashtag 470 receives a selection signal, the selected hashtag is added to the feedback input area 465.

The post button 472 is a user interface control element that can receive selection signals. When the post button 472 receives a selection signal, the contents of the feedback input area 465, including any selected hashtags, and the feedback label 466 including the timestamp, are sent to the media player back end system, e.g., a server of media player back end system 142. At the back end system, a data record is created and the contents of the feedback input area 465, including any selected hashtags and the feedback label 466 including the timestamp are stored in the data record, e.g. in structured feedback repository 184, along with the source identifier associated with the viewing user, the media item identifier, and optionally, an identifier for the timestamped segment associated with the feedback.

Although not specifically shown in the drawings, in various implementations, one or more elements shown in FIG. 4A can be used in combination with aspects shown in any of FIG. 3A, FIG. 3B, or FIG. 4B, and one or more elements shown in FIG. 4B can be used in combination with aspects shown in any of FIG. 3A, FIG. 3B, or FIG. 4A.

Figure 5A:
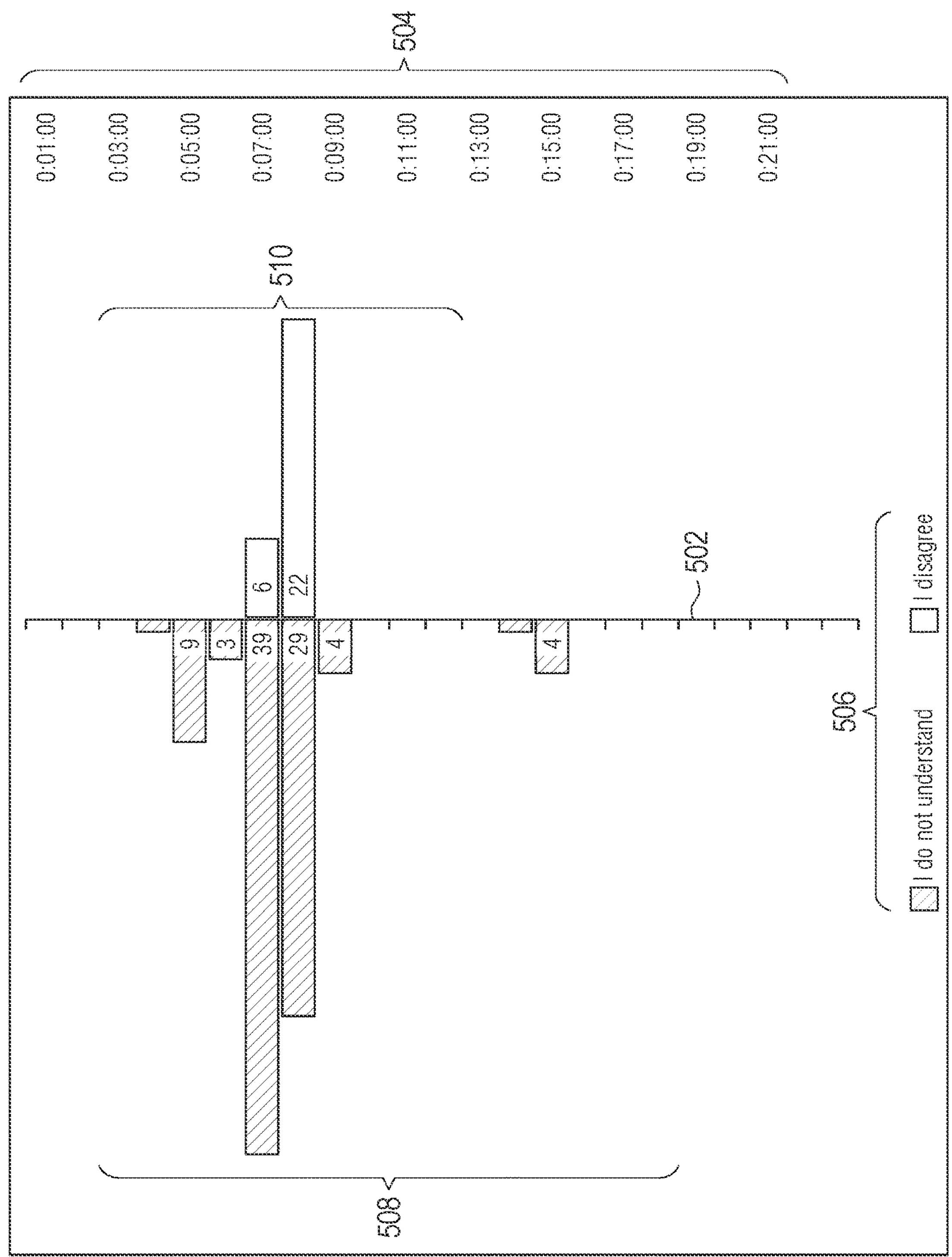
FIG. 5A is an example implementation of structured feedback output 500 in accordance with some embodiments of the present disclosure.

FIG. 5A is an example implementation of structured feedback output 500 in accordance with some embodiments of the present disclosure. Structured feedback output 500 can be generated, for example, by the structured feedback output generator 148 of FIG. 1 and presented to a creator by, for example, the structured feedback analytics 117 of the creator interface 116 of FIG. 1. The structured feedback output 500 includes a graphical representation of aggregate timebound structured feedback received from a population of viewing users of a published multimedia item, e.g., in the form of a report that includes one or more graphs, such as bar graphs, and/or tables of aggregate feedback information according to feedback category. The graphical representation of the output 500 enables the creator of the multimedia item to quickly identify segments within the multimedia item that may need revision or further explanation.

A timeline 502, 504 indicates the elapsed playback time markers over the duration of the multimedia item for which the feedback are aggregated. A legend 506 indicates the feedback categories represented in the output 500.

Bar graphs 508, 510 indicate counts of the different types of feedback received at different timestamps during playback of the multimedia item. The length of the bars in the bar graphs correspond to the count values, e.g., a longer bar indicates a greater number of feedback received. For example, bar graph 508 represents counts of feedback in the "I do not understand" category and the timestamps at which the feedback were received, e.g., 39 viewing users submitted an "I do not understand" feedback at the 0:07:00 mark. Similarly, bar graph 510 represents counts of feedback in the "I disagree" category and the timestamps at which the feedback were received, e.g., 22 viewing users submitted an "I disagree" feedback between the 0:07:00 and 0:09:00 marks.

Figure 5B:
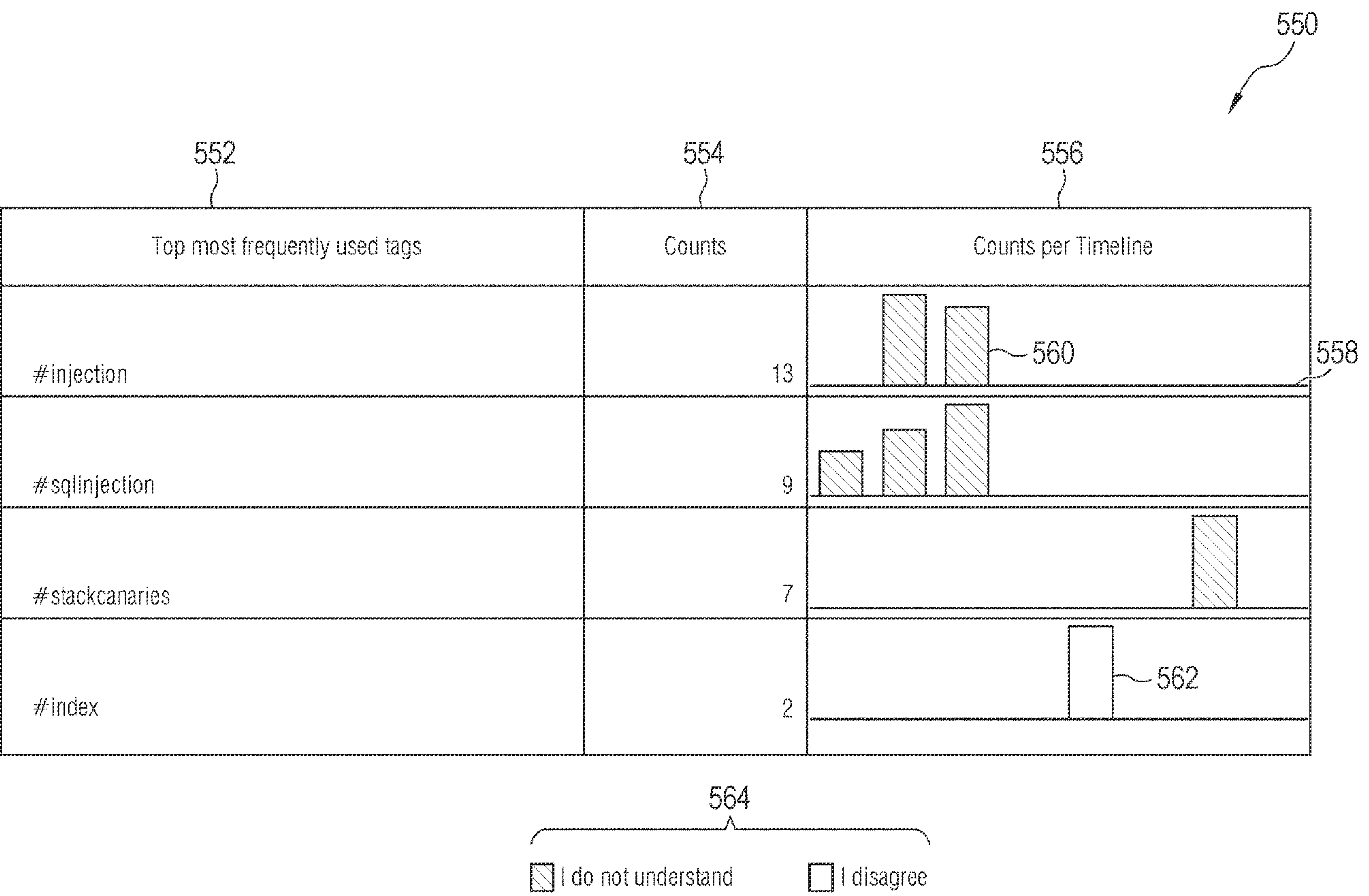
FIG. 5B is an example implementation of structured feedback output 550 in accordance with some embodiments of the present disclosure.

FIG. 5B is an example implementation of structured feedback output 550 in accordance with some embodiments of the present disclosure. Structured feedback output 550 can be generated, for example, by the structured feedback output generator 148 of FIG. 1 and presented to a creator by, for example, the structured feedback analytics 117 of the creator interface 116 of FIG. 1. The structured feedback output 550 includes a graphical representation of aggregate timebound structured feedback received from a population of viewing users of a published multimedia item mapped to a ranked list of hashtags or feedback category labels. The graphical representation of the output 550 enables the creator of the multimedia item to easily determine which topics within the multimedia item generated the most feedback and where on the timeline those feedback occurred.

The output 550 is presented in a tabular form that includes columns 552, 554, 556. Column 552 presents a ranked list of the hashtags or feedback categories that were most often associated with feedback. For instance, #injection had the highest number of occurrences in the feedback and #index had the lowest number of occurrences in the feedback. Column 554 indicates the total count of occurrences for each hashtag in the ranked list of column 552. For example, #injection was included in 13 feedback while #index was included in 2 feedback.

Column 556 indicates, for a given hashtag, the number of times the hashtag was included in feedback according to timestamp. The hashtag counts are indicated on a timeline, e.g., timeline 558, using a bar graph, for example the height of bar 560 indicates the number of occurrences of the "I do not understand" feedback category that contained the hashtag #injection at a particular timestamp. Similarly, the height of bar 562 indicates the number of occurrences of the "I disagree" feedback category" containing the hashtag #index at a particular timestamp that occurred temporally after the timestamp of the bar 560. For example, #injection and #sqlinjection were included in feedback that were posted in the beginning or temporally earlier segments of the multimedia item while #stackcanaries and #index were included in feedback that were posted in temporally later segments of the multimedia item.

The feedback categories and labels shown in FIG. 5A and FIG. 5B are illustrative and can be determined based on the requirements of a particular application. For example, in FIG. 5A, the feedback categories could include "I agree" and "I disagree," and in FIG. 5B, non-hashtag feedback category labels, e.g., topics, could be used instead of hashtags. Although not specifically shown in the drawings, in various implementations, one or more elements shown in FIG. 5A can be used in combination with aspects shown in FIG. 5B, and one or more elements shown in FIG. 5B can be used in combination with aspects shown in FIG. 5A.

FIG. 1 illustrates an example of a computing system 100 that includes a structured feedback generation system in accordance with some embodiments of the present disclosure. In the embodiment of FIG. 1, computing system 100 includes one or more user systems 110, a network 120, an application software system 130, an online media hosting service 140, a content serving system 160, an event logging service 170, and a data storage system 180.

As described in more detail below, components of the structured feedback generation system are implemented in a media content management interface 113 and/or a media player back end system 142 of computing system 100. For example, media content management interface 113 includes a graphical user interface (GUI) tool configured to enable users to play media files via user systems. In some implementations, media content management interface 113 enables both the playback of media files by viewing users and the editing of media files. For example, media content management interface 113 allows users to edit media files that the users have created and/or allows viewing users to add edits or comments to media items created by other users (e.g., in collaboration). In other implementations, the viewing and editing functionality are provided by different software stacks such that media content management interface 113 includes only one or the other of playback interface 114 or creator interface 118. For example, creator interface 116 can include tools for creating and editing videos, e.g., video authoring/editing tools, while playback interface 114 provides one or more media players. Further, in some implementations, creator interface 116 is implemented as an offline tool. In other implementations, media content management interface 113 includes a portal used by both content creators to create and upload videos and by viewers to playback videos.

In the implementation of FIG. 1, a structured feedback mechanism 115 and structured feedback analytics 117 are components of media content management interface 113 while a structured feedback input generator 144, a structured feedback processor 146, and a structured feedback output generator 148 are components of media player back end system 142. Also in the implementation of FIG. 1, media content management interface 113 is a component of a user interface 112 of user system 110 and media player back end system 142 is a component of online media hosting service 140.

A user system 110 includes at least one computing device, such as a personal computing device, a server, a mobile computing device, or a smart appliance, and at least one software application that the at least one computing device is capable of executing. Many different user systems 110 can be connected to network 120 at the same time or at different times. Different user systems 110 can contain similar components as described in connection with the illustrated user system 110. For example, many different end users of computing system 100 can be interacting with many different instances of media content management interface 113 on their respective user systems 110, at the same time or at different times.

User system 110 includes a user interface 112. User interface 112 is installed on or accessible to user system 110 by network 120. For example, embodiments of user interface 112 include a graphical display screen that includes at least one slot. A slot as used herein refers to a space on a graphical display such as a web page or mobile device screen, into which digital content including multimedia files may be loaded for display to the user. The locations and dimensions of a particular slot on a screen are specified using, for example, a markup language such as HTML (Hypertext Markup Language). On a typical display screen, a slot is defined by two-dimensional coordinates. In other implementations such as virtual reality or augmented reality implementations, a slot may be defined using a three-dimensional coordinate system.

User interface 112 can be used to input data, upload, download, receive, send, or share content including multimedia files, initiate user interface events, and view or otherwise perceive output such as data produced by application software system 130, online media hosting service 140, and/or content serving system 160. For example, user interface 112 can include a graphical user interface (GUI), a conversational voice/speech interface, a virtual reality, augmented reality, or mixed reality interface, and/or a haptic interface. User interface 112 includes a mechanism for logging in to application software system 130 and/or online media hosting service 140, clicking or tapping on GUI elements, and interacting with digital content items such as multimedia files. Examples of user interface 112 include web browsers, command line interfaces, and mobile app front ends. User interface 112 as used herein can include application programming interfaces (APIs).

Media content management interface 113 includes playback interface 114 and creator interface 116. Playback interface 114 enables previously recorded multimedia files to be played back on user system 110. Creator interface 116 enables multimedia files to be created and edited on a user system 110 and/or published from the user system 110 to online media hosting service 140 for playback through a playback interface 114 of any user system 110 connected to network 120.

Playback interface 114 includes structured feedback mechanism 115. Structured feedback mechanism 115 enables users viewing multimedia files through playback interface 114 to submit input that is formulated as or converted to structured feedback, which is made available to the multimedia file creators via, e.g., creator interface 116. Example implementations of structured feedback mechanism 115 are described below.

Creator interface 116 includes structured feedback analytics 117. Structured feedback analytics 117 enables multimedia creators to view structured feedback generated in response to viewing user input received via playback interface 114 from users viewing the creators' respective multimedia files that the creators have published to online media hosting service 140. Example implementations of structured feedback analytics 117 are described below. Creator interface 116 can include other functionality that enables creators to create and edit multimedia file, in addition to the mechanisms for uploading, publishing, and receiving feedback on multimedia files.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Application software system 130 is any type of application software system that provides or enables the creation and/or distribution of at least one form of digital content including multimedia files to user systems such as user system 110 through user interface 112. In some implementations, media content management interface 113, online media hosting service 140, and/or media player back end system 142 are components of application software system 130. Examples of application software system 130 include but are not limited to online services such as online learning or education platforms, professional social network software and/or other social graph-based applications, as well as other online systems that are or are not be based on social graph software, such as general-purpose search engines, specific-purpose search engines, messaging systems, content distribution platforms, e-commerce software, enterprise software, or any combination of any of the foregoing or other types of software.

In some implementations, application software system 130 is a software as a service (SaaS) platform that hosts and streams multimedia files through online media hosting service 140. Creators can use any available platform or tool to create and/or edit their multimedia files. When the creators are ready to distribute their multimedia content, the creators upload their multimedia files to the SaaS platform where the files will be hosted and streamed to viewing user devices over the network 120. To view the creator's published content, the user devices of the viewing users connect to the media player back end system 142 of the online media hosting service 140 through the media content management interface 113 rather than connecting directly to the creator's device. In these implementations, the viewing user devices download or stream multimedia files from cloud servers to which they are redirected by the playback interface 114. Feedback submitted by viewing users and any responses from the creator are stored by the SaaS platform for persistence, and the SaaS platform generates analytics that are communicated to the creator asynchronously through the online media hosting service 140. Similarly, any responses generated by the creator are communicated to viewing users through the SaaS platform.

A client portion of application software system 130 can operate in user system 110, for example as a plugin or widget in a graphical user interface of a web application, mobile software application, or as a web browser executing user interface 112. For example, media content management interface 113 can be implemented in a client portion of application software 130, and structured feedback mechanism 115 and/or structured feedback analytics 117 can be implemented as plugins that are registered with the media content management interface 113.

In an embodiment, a mobile app or a web browser of a user system 110 can transmit a network communication such as an HTTP request over network 120 in response to user input that is received through a user interface provided by the web application, mobile app, or web browser, such as user interface 112. A server running application software system 130 can receive the input from the web application, mobile app, or browser executing user interface 112, perform at least one operation using the input, and return output to the user interface 112 using a network communication such as an HTTP response, which the web application, mobile app, or browser receives and processes at the user system 110.

Online media hosting service 140 includes media player back end system 142. Media player back end system 142 receives requests for playable media items from various instances of media content management interface 113 implemented on various user systems 110, and sends instructions for accessing the requested media items to the requesting instances of media content management interface 113. For example, media player back end system 142 sends a link, e.g., a uniform resource locator (URL) or uniform resource name (URN) for a requested media item stored in playable media 182 to a requesting instance of media content management interface 113 so that the media content management interface 113 can load the requested media item into playback interface 114.

Media player back end system 142 includes structured feedback input generator 144, structured feedback processor 146, and structured feedback output generator 148. Structured feedback input generator 144 generates or selects user interface elements including prompts for input from viewers of multimedia files through structured feedback mechanism 115 of playback interface 114. For example, structured feedback input generator 144 determines the type and configuration of user interface elements to be presented by structured feedback mechanism 115 to the viewing user through playback interface 114 and provides the user interface elements to the playback interface 114.

Structured feedback processor 146 processes the input received from viewing users via structured feedback mechanisms 115 of media content management interfaces 113 of a number of different user systems 110, formulates or converts the received viewing user input into structured feedback, and stores the structured feedback in a data store, such as structured feedback repository 184. For example, structured feedback processor 146 receives input from many different users viewing many different multimedia files of playable media 182, converts the respective input received from respective viewing users into structured feedback, and stores the respective structured feedback in a searchable database of structured feedback repository 184.

In some implementations, structured feedback processor 146 stores each structured feedback in a separate data record. In some implementations, each data record includes a source identifier that identifies a source of the structured feedback (e.g., a user identifier, session identifier, device identifier, and/or network address), a media identifier that identifies the multimedia file associated with the structured feedback, and the structured feedback data. An instance of structured feedback data includes, for example, at least one label. An instance of structured feedback can include, in addition to structured feedback, unstructured feedback such as a block of uncategorized free text (e.g., one or more sentences) and/or an audio clip of conversational natural language comments, which are associated with a feedback label, for example. In some implementations, structured feedback processor 146 also stores, in the data record, timestamp data associated with the structured feedback, where the timestamp data links the structured feedback to a particular segment of the multimedia file to which the structured feedback relates.

Structured feedback output generator 148 applies one or more aggregation operations on the structured feedback data records created and stored by structured feedback processor 146. Examples of aggregation functions include count functions and other mathematical or statistical functions such as average, mean, minimum, and maximum. For instance, structured feedback output generator 148 generates a count of occurrences of each different structured feedback label, and links each occurrence of each particular structured feedback label with a particular timestamp or timeframe during playback of a particular multimedia file. For instance, the aggregate count of "I do not understand" structured feedback across all viewing users of a media item is five at time 00:10 and zero at time 00:20. In some implementations, timestamp may refer to a very particular time value, e.g., milliseconds. Accordingly, in some implementations, each feedback is stored with a respective timestamp, and the structured feedback output generator 148 aggregates the feedback over a range of timestamps that corresponds to a timeframe, e.g., aggregation of feedback linked with timestamps in a certain time interval; for example, a feedback linked with a timestamp 2022 Jan. 9 20:21:19.123 and another feedback linked with a different timestamp 2022 Jan. 9 20:21:20.278 could belong to the same timeframe and counted as 2 instances of feedback for the timeframe.

In other examples, structured feedback output generator 148 generates counts of occurrences of each of the different structured feedback labels for each multimedia file, user, or user group, for a particular multimedia file or across a group of multimedia files.

Structured feedback output generator 148 generates visual representations of aggregate structured feedback data and sends the visual representations to creator interface 116 for presentation to the creator via structured feedback analytics 117. For example, structured feedback output generator 148 generates a table, bar chart, pie chart, line graph, and/or histogram for presentation to the creator via structured feedback analytics 117. In some implementations, the type of output generated by structured feedback output generator 148 is determined based on one or more inputs received from creator interface 116. For example, creator interface 116 is configured to prompt the creator to select an output type for the structured feedback analytics 117, creator interface 116 sends the selected output type to structured feedback output generator 148, and structured feedback output generator 148 generates a visual representation of aggregate structured feedback based on the selected output type received from the creator interface 116.

In some implementations, structured feedback output generator 148 generates a link that associates a visual representation of a set of aggregate structured feedback with the individual data records used to create the visual representation. In those implementations, structured feedback output generator 148 sends the link to creator interface 116 along with the visual representation. Creator interface 116 presents the link along with the visual representation. If the creator selects the link, creator interface 116 presents portions of the individual data records that contributed to the aggregate data, thereby enabling the creator to drill down from a view of the visual representation of the aggregated structured feedback to a more granular view of individual feedback.

In some implementations, the described structured feedback generation system including components of media content management interface 113 and media player back end system 142 is implemented using a distributed application programming interface (API) service architecture. The distributed API service architecture provides scalability by enabling structured feedback mechanism 115 to be used by thousands or even millions of concurrent users.

Some implementations utilize a secure public protected API to ensure that structured feedback are properly tracked and attributed to the appropriate user systems and multimedia files as the feedback are communicated to the server side. For example, a secure public protected API is used to pass structured feedback and associated identifier data from a user system's browser or mobile device to the back end to be stored in structured feedback repository 184. A communication between a media content management interface (e.g., front end) 113 and media player back end system 142 includes, for example, a session identifier or other form of identifier that identifies the source user account associated with the login and viewing of the multimedia file through playback interface 114. The request including the session identifier (or other suitable identifier) establishes bidirectional communication between the user system's media content management interface 113 and the media player back end system 142 before the requested multimedia file is played in playback interface 114.

When the user system's media content management interface 113 receives structured feedback from the viewing user through structured feedback mechanism 115 during playback of the multimedia file, structured feedback mechanism 115 includes the session identifier (or other suitable identifier) along with the received feedback in one or more communications that structured feedback mechanism 115 passes to the media player back end system 142. When the media player back end system 142 receives a feedback, it uses the associated session identifier (or other suitable identifier) to verify that the feedback was received from the same user system playing the multimedia file to which the feedback relates.

In some implementations, playable media 182 and/or structured feedback repository 184 are implemented using distributed data storage. The distributed data storage is configured to handle concurrent accesses at scale. For example, each multimedia file is stored in a distributed data storage with an associated media file identifier, and the distributed data storage is partitioned by the media file identifier for scalability and/or for faster read/write operations.

As shown in FIG. 2A and described in more detail below, in some implementations, structured feedback processor 146 is implemented with a machine learning system, such as machine learning system 220, which is configured as a feedback category generator. For example, the machine learning system collects structured feedback data from many user systems over time during use of the structured feedback generation system or during a training phase, and generates statistical correlations between user inputs, multimedia file metadata, and structured feedback. The machine learning system uses those statistical correlations to generate feedback label suggestions, which structured feedback mechanism 115 can present to users viewing multimedia files through playback interface 114. Examples of feedback label suggestions include category labels (e.g., I disagree, I agree, I need clarification, etc.) and hashtags that identify particular topics or content to which the feedback relates (e.g., #security, #ai, #leadership). For example, if the machine learning system determines that a statistically significant (e.g., more than 70%) of users viewing a learning video that teaches how to change settings within a social media app requested clarification of the video's explanation of how to change the security settings, then the next time a user inputs feedback on that same segment of that same learning video, the machine learning system may prompt the user to add the #securitysettings hashtag to their feedback.

Content serving system 160 is a data storage service, such as a web server, which stores digital content items and delivers digital content items, such as multimedia files, to, for example, web sites and mobile apps or to particular slots of web sites or mobile app user interface display screens. For instance, content serving system 160 scores and ranks multimedia files for placement in user feeds. The digital content items stored and distributed by content serving system 160 can contain various types of content including video and/or audio streams.

In some embodiments, content serving system 160 processes requests from, for example, application software system 130 or online media hosting service 140, and distributes digital content items, including multimedia files, to user systems 110 in response to requests. A request is, for example, a network message such as an HTTP (HyperText Transfer Protocol) request for a transfer of data from an application front end to the application's back end, or from the application's back end to the front end. A request is formulated, e.g., by a browser or mobile app at a user device, in connection with a user interface event such as a login, click or a page load. In some implementations, content serving system 160 is part of application software system 130 or online media hosting service 140.

In some implementations, application software system 130 uses content serving system 160 to rank and distribute media items to viewing users, e.g., via user feeds, landing pages, or inboxes. In some implementations, one or more components of content serving system 160 are used to facilitate the generation of structured feedback labels. For example, output of a classification model or scoring model of content serving system 160, which may be created during a process of ranking media items for distribution to viewing users, can also be used to determine labels for structured feedback. Content serving system 160 includes at least one content classification model 162 and at least one content scoring model 164. Content classification model 162 is a machine learning model that has been trained to classify an input by assigning one or more semantic labels to the input based on a statistical or probabilistic similarly of the input to labeled data used to train the model. Content classification model 162 is created by applying a machine learning algorithm, such as linear regression or logistic regression, to a set of training data using, for example, a supervised machine learning technique. In supervised machine learning, the set of training data includes labeled data samples. In some implementations, content classification model 162 is created by applying a clustering algorithm, such as k means clustering, to a set of training data that includes unlabeled data samples, using an unsupervised machine learning technique. An example of a content classification model is a binary classifier that identifies inputs as either spam or not spam. Another example of a content classification model is a topic model that assigns an input to one topic or multiple topics based on similarities between the input and the unlabeled data used to train the model. In some implementations, content classification model 162 is used to sort multimedia files by category. For example, in an online learning service, content classification model 162 can group uploaded multimedia files into categories such as software engineering, patent law, business management, and leadership.

Content scoring model 164 is a machine learning model that is trained to generate a score for a pair of inputs, where the score statistically or probabilistically quantifies a strength of relationship, correlation, or affinity between the inputs in the pair. Content scoring model 164 includes, for example, a deep learning neural network model that is trained on training data that includes ground-truth sets of data pairs. Examples of content scoring models include ranking models that rank content items for distribution to a particular user or user group, such as for inclusion in a user or affinity group's news feed or online learning portal, where the ranking is based on training examples of the user's or affinity group's history of clicking or not clicking on content items previously displayed in user interface 112 (e.g., [user1, contentID1, 1]; [user1, contentID2, 0], where 1 indicates a click and 0 indicates no click).

In some implementations, user interface events that are logged by, e.g., event logging service 170, during media playback, such as rewind, forward, pause, etc., can be used to generate feedback labels. For example, a sequence of repeating user rewinding events in the same segment of video can be linked to a feedback label of "request for clarification" or "I don't understand" because the behavior of replaying a video segment multiple times is often associated with users who do not understand the content easily. Event logging service 170 captures user interface events generated at the user interface 112, such as rewinds, forwards, pauses, page loads and clicks, in real time, and formulates the user interface events into a data stream that can be consumed by, for example, a stream processing system. For example, when a user of user system 110 clicks on a user interface element such as a content item including digital imagery, a link, or a control such as a view, comment, share, or reaction button, or a structured feedback mechanism, or uploads a file, or loads a web page, or scrolls through a feed, etc., event logging service 170 fires an event to capture an identifier, an event type, a date/timestamp at which the user interface event occurred, and possibly other information about the user interface event, such as the impression portal and/or the impression channel involved in the user interface event (e.g., device type, operating system, etc.). For instance, when a user interacts with playback interface 114 or structured feedback mechanism 115 receives user input, event logging service 170 stores the corresponding event data in a log. Event logging service 170 generates a data stream that includes one record of real-time event data for each user interface event that has occurred. Event data logged by event logging service 170 can be used, for example, to train content scoring model 164 and/or content classification model 162. In some implementations, event data logged by event logging service 170 is used to train a machine learning model, such as a machine learning model of machine learning system 220, described below, to generate feedback label recommendations.

Data storage system 180 includes data stores and/or data services that store digital content items including multimedia files, data received, used, manipulated, and produced by application software system 130 and/or online media hosting service 140, including feedback category labels, structured feedback data, event data, machine learning model training data, machine learning model parameters, and machine learning model inputs and outputs. In some embodiments, data storage system 180 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 180 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

While not specifically shown, it should be understood that any of user system 110, application software system 130, online media hosting service 140, content serving system 160, event logging service 170, and data storage system 180 includes an interface embodied as computer programming code stored in computer memory that when executed causes a computing device to enable bidirectional communication with any other of user system 110, application software system 130, online media hosting service 140, content serving system 160, event logging service 170, and data storage system 180 using a communicative coupling mechanism. Examples of communicative coupling mechanisms include network interfaces, inter-process communication (IPC) interfaces and application program interfaces (APIs).

Each of user system 110, application software system 130, online media hosting service 140, content serving system 160, event logging service 170, and data storage system 180 is implemented using at least one computing device that is communicatively coupled to electronic communications network 120. Any of user system 110, application software system 130, online media hosting service 140, content serving system 160, event logging service 170, and data storage system 180 can be bidirectionally communicatively coupled by network 120. User system 110 as well as other different user systems (not shown) can be bidirectionally communicatively coupled to application software system 130.

A typical user of user system 110 can be an administrator or end user of application software system 130, online media hosting service 140 and/or content serving system 160. User system 110 is configured to communicate bidirectionally with any of application software system 130, online media hosting service 140 and/or content serving system 160 over network 120.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 110, application software system 130, online media hosting service 140, content serving system 160, event logging service 170, and data storage system 180 are implemented using computer software, hardware, or software and hardware, and can include combinations of automated functionality, data structures, and digital data, which are represented schematically in the figures. User system 110, application software system 130, online media hosting service 140, content serving system 160, event logging service 170, and data storage system 180 are shown as separate elements in FIG. 1 for case of discussion but, except as otherwise described, the illustration is not meant to imply that separation of these elements is required. The illustrated systems, services, and data stores (or their functionality) of each of user system 110, application software system 130, online media hosting service 140, content serving system 160, event logging service 170, and data storage system 180 can be divided over any number of physical systems, including a single physical computer system, and can communicate with each other in any appropriate manner.

Figure 7:
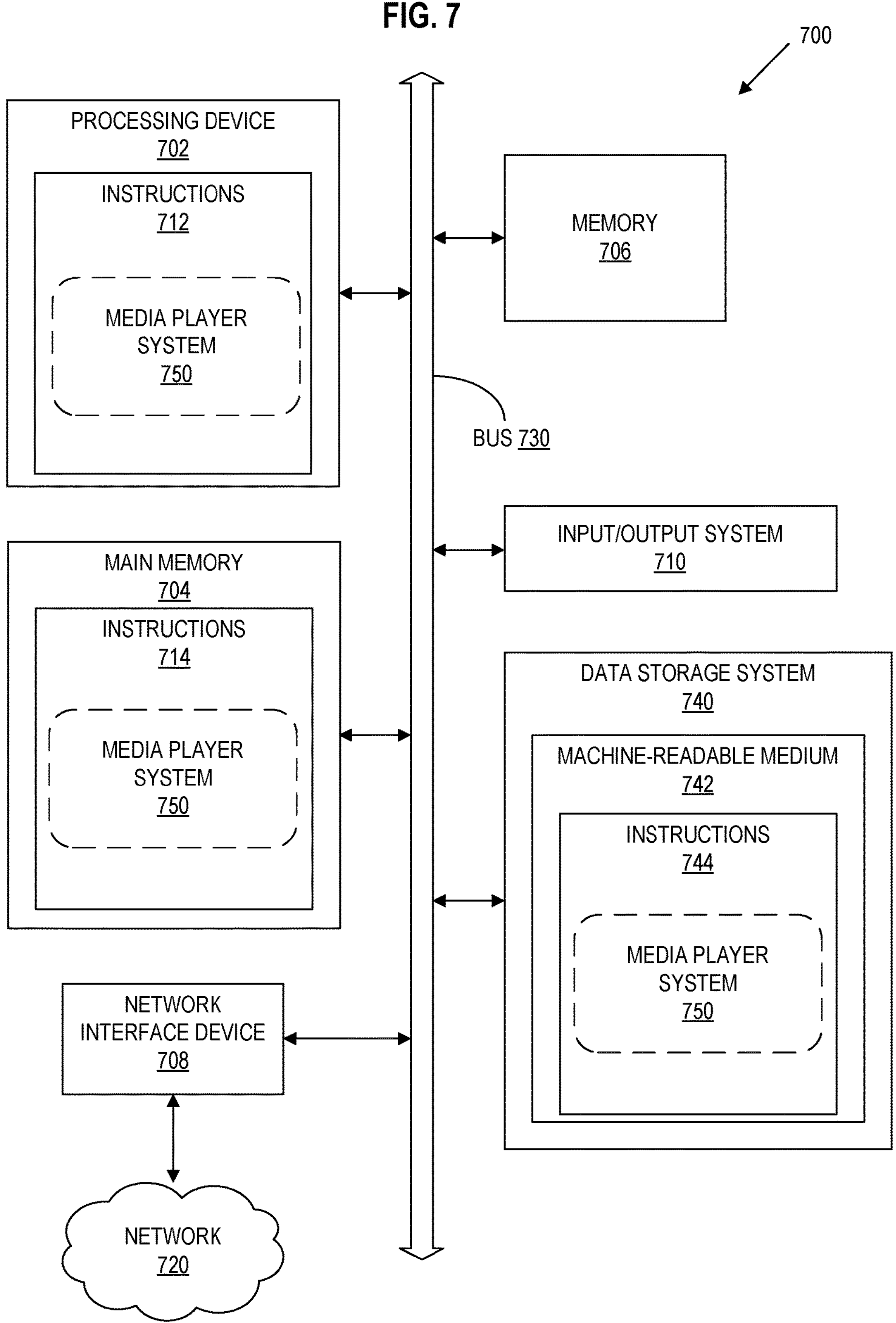
FIG. 7 is a block diagram of an example computer system 700 including a media playing service 750 in accordance with some embodiments of the present disclosure.

For case of discussion, in FIG. 7, the online media hosting service 140 is represented as media player system 750. Further details with regard to the operations of the online media hosting service 140 are described below.

FIG. 2A is a flow diagram of an example method 200 for generating and processing structured feedback in accordance with some embodiments of the present disclosure.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by various components of the computing system 100 of FIG. 1 including portions of media content management interface 113 and/or portions of media player back end system 142. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, processes can be omitted in various embodiments. Thus, not all processes are required in every embodiment. Other process flows are possible.

In FIG. 2A, according to the method 200, a creator operating a user system (e.g., a client device) 110 executing creator interface 116 uploads and publishes created media 202, e.g . . . a multimedia file, to media player back end system 142. Media player back end system 142 stores created media 202 in a data store of playable media 182. In some implementations, media player back end system 142 generates one or more auxiliary files and stores the one or more auxiliary files with the created media 202 in playable media 182. Examples of auxiliary files include files that contain subtitles, different language versions of the created media 202, different versions of the created media 202 for different playback devices or operating systems, and creator message data 218. Creator message data 218 is described in more detail below.

After created media 202 is published, e.g., for mass consumption through an online portal, by media player back end system 142, any user operating a user device 110 executing playback interface 114 can issue a playback request 204 to media player back end system 142 for playback of created media 202 or any other media published by media player back end system 142. Playback request 204 is, for example, an HTTP request or get command. Playback request 204 includes a source identifier that identifies the user system 110 sending the playback request and a media identifier that identifies the particular multimedia item being requested.

In response to a playback request 204, media player back end system 142 sends playback data 206 to playback interface 114. Playback data 206 includes one or more links to media files associated with the media requested for playback by playback request 204. An example of a link is a uniform resource locator (URL) or uniform resource name (URN).

In response to playback data 206, playback interface 114 retrieves the requested media 210 that matches the playback request 204. In streaming implementations, playback interface 114 begins playing segments of requested media 210 as they are received at the user device 110. In non-streaming applications, playback interface 114 begins playing requested media 210 after all segments of the requested media 210 have been received at the user device 110.

Also in response to a playback request 204 or as part of loading playback interface 114 into media content management interface 113, structured feedback input generator 144 sends structured feedback UI elements 208 to playback interface 114. Examples of structured feedback UI elements 208 are shown in FIG. 3A, FIG. 3B, FIG. 4A, and FIG. 4B, described below. As discussed in more detail below, the structured feedback UI elements 208 are selected and loaded into playback interface 114 based on event data logged by logging service 170 and/or based on category data 215, in some implementations.

Structured feedback mechanism 115 loads one or more structured feedback UI elements 208 into playback interface 114 and renders the elements 208 as selectable or otherwise interactive control elements during playback of the requested media 210 in playback interface 114. In response to structured feedback mechanism 115 receiving a selection signal and/or other user input through one or more of the elements 208, structured feedback mechanism 115 converts the received user input to structured feedback, formulates structured feedback data 212, which includes the structured feedback and identifying information such as a user identifier or session identifier, a media item identifier, and a timeframe associated with the user input, and sends the structured feedback data 212 to structured feedback processor 146 of media player back end system 142.

The process used to convert the received user input to structured feedback (e.g., a feedback label such as a feedback type or category) depends on the type of user input received. For example, if the user input includes a selection signal for a user selection of a feedback category button on the GUI, such as an Agree/Disagree button or a Needs Clarification button, then the structured feedback includes the feedback category associated with the user-selected button. In another example, the structured feedback includes a label that is extracted from natural language user input using a named entity recognition process. For instance, if the user input includes a text explanation of a point of disagreement or lack of clarity with respect to a particular time segment of a video, the structured feedback can include a keyword extracted from the user input using named entity recognition. As another example, where the user input includes a sequence or pattern of user activity signals logged by event logging service 170, the sequence or pattern of user activity signals is mapped to a feedback label using, e.g., a classification model, pattern recognizer, or lookup table. As an example, a pattern of user activity such as the user replaying the same segment of a video multiple times within a short time span can be interpreted as a signal of user confusion or lack of comprehension of the subject matter discussed in that segment. Accordingly, the pattern of user activity can be mapped to a feedback label of "request for clarification" or "I do not understand."

Structured feedback processor 146 creates a data record containing structured feedback data 212 and stores the data record in structured feedback repository 184. The data record includes at least a source identifier of the device, user, or login session associated with playback request 204 and a media identifier that identifies requested media 210.

In some implementations, the requested media 210 is divided, e.g., by playback interface 114, into time-based segments. For instance, a video is divided into multiple segments and, at playback time, each segment of the video is linked with a timestamp, where the timestamp corresponds to the playback time at which the segment is rendered in the playback interface 114. For example, a video playback starts at time zero and the playback time is incremented in time steps (e.g., seconds or tenths of seconds) as the video is played, such that each successive segment of the video is linked with a subsequent cumulative playback time.

As such, the data record also includes timestamp data associated with the segment of the requested media 210 being viewed at the time the user input used to create the structured feedback was received, in some implementations. For example, if user input is received on a video segment that is rendered by playback interface 114 thirty seconds after the start of the playback of a video, the timestamp associated with the segment could be 00:00:30.0, and this timestamp is linked with the user input received on that segment. Although certain implementations provide mechanisms for user submission of segment-level input based on playback time, it is not necessary for the user input to pertain strictly to a particular time-based segment of a multimedia file. For example, the viewing user can submit a general comment about the entire media item at any point during the playback of the media item.

In some implementations, structured feedback processor 146 sends structured feedback data 212 to machine learning system 220. In some implementations, machine learning system 220 includes at least one machine learning model that has been trained, e.g., using historical event data 222 and/or attribute data 224 logged by logging service 170, to determine probabilistic or statistical correlations between structured feedback data 212 and feedback labels.

In some implementations, event data 222 and/or attribute data 224 are extracted from event data logged by event logging service 170 and used by structured feedback output generator 148 to configure the aggregate structured feedback data 216. For example, event data 222 and/or attribute data 224 can be used to sort, classify, or filter the aggregate structured feedback data 214 based on one or more criteria. Event data 222 includes, for example, historical user interactions with multimedia files through playback interface 114. For instance, a machine learning model of machine learning system 220 can be trained to recognize a pattern of user activity, such as the user replaying the same segment of a video multiple times within a short time span, as a signal of user confusion or lack of comprehension of the subject matter discussed in that segment.

Attribute data 224 includes, for example, metadata associated with a particular user, user group, or multimedia file, such as profile data. Portions of attribute data 224 can be combined with portions of event data 222 to create machine learning model inputs for machine learning system 220. Alternatively or in addition, attribute data 224 can be used to sort or filter aggregate structured feedback data 214. For example, aggregate structured feedback data 214 can be sorted or filtered based on the job titles or preferred languages associated with the viewing users who are the sources of the structured feedback. For example, a video creator may wish to see only the structured feedback associated with users who are currently students or whose preferred language is not English.

Once trained, a machine learning model of machine learning system 220 can be applied to, e.g., inputs including combinations of event data 222, attribute data 224, and/or structured feedback data 212. Based on the free text input, machine learning system 220 outputs suggested hashtags or feedback category labels for the user to potentially include in a submission of structured feedback data 212. Alternatively or in addition to machine learning system 220, structured feedback processor 146 includes a rules engine that contains e.g., Boolean logic or matching rules configured to determine label data 215 based on structured feedback data 212.

The structured feedback processor 146 provides suggested category labels and/or hashtags produced, for example, by machine learning system 220 or another mechanism such as a rules engine, to structured feedback input generator 144 as label data 215. Thus, in some implementations there can be multiple rounds of interaction, e.g., an iterative loop, that includes structured feedback input generator 144 providing UI elements 208 to playback interface 114, structured feedback processor 146 receiving and storing structured feedback data 212 from structured feedback mechanism 115, structured feedback processor 146 providing label data 215 to structured feedback input generator 144, structured feedback input generator 144 providing additional UI elements 208 to playback interface 114 based on label data 215, and structured feedback processor 146 receiving and storing additional structured feedback data 212 from structured feedback mechanism 115.

In this way, structured feedback processor 146 can auto-generate a list of suggested hashtags or keywords (e.g., categories) from which users can manually select hashtags or categories to be included in the user's feedback on the media item. The list of suggested hashtags or keywords can be generated based on a transcript of the media item and/or hashtags categories that have been previously input or selected by other users in prior interactions with the same media item or with the media player system. In other implementations, the structured feedback processor 146 machine learns statistical correlations between hashtags or keywords and media content based on training data that includes historical user interaction data (e.g., historical media segment-keyword pairs) and then automatically assigns hashtags or keywords to media segments.

At a user device 110 executing creator interface 116, the creator of requested media 210 is presented with structured feedback analytics 117. Structured feedback analytics 117 include, for example, graphical representations of aggregate structured feedback data 216. The graphical representations of aggregate structured feedback data 216 are generated by structured feedback output generator 148 in response to a request from creator interface 116 or periodically, e.g., as an offline job. For example, structured feedback output generator 148 runs a daily or weekly job that executes one or more queries on structured feedback repository 184 to generate aggregate structured feedback data 214 and formulates the aggregate structured feedback data 214 into a graphical representation, which is sent to creator interface 116 for presentation by structured feedback analytics 117. In some implementations, the aggregate feedback data generation and graphical representation generation tasks are performed by two different components or processes. For example, a first process converts raw data into an aggregated form convenient for further representation, and subsequently, a visual report generator generates various forms of visualizations of the aggregate data, e.g., on a separate schedule or on demand in response to a client request.

Aggregate structured feedback data 216 includes aggregate feedback data for a specific media item created by the creator logged in to creator interface 116. Thus, in some implementations, each creator using creator interface 116 is able to view only the structured feedback data for media items published by that creator to media player back end system 142, and is not able to view feedback data pertaining to other creators' content. Examples of graphical representations of aggregate structured feedback data 216 are shown in FIG. 5A and FIG. 5B, described below.

In response to aggregate structured feedback data 216 for a particular media item published by a creator to media player back end system 142, the creator can generate creator message data 218 through creator interface 116. Examples of creator message data 218 include responses to structured feedback data such as a set of frequently asked questions (FAQs) and responses, error corrections, and revisions or updates to portions of the created media 202. Creator message data 218 created by a creator through creator interface 116 includes the media identifier of the creator's media item associated with the aggregate structured feedback data 216. The creator can upload and publish the creator message data 218 to media player back end system 142.

After creator message data 218 is uploaded and published to media player back end system 142, media player back end system 142 stores creator message data 218 in association with the applicable media item, e.g., created media 202, in playable media 182. For example, media player back end system 142 adds creator message data 218, e.g., as an auxiliary file or metadata, to the package containing the media item to which creator message data 218 applies. After creator message data 218 is stored in playable media 182, the next time the associated media item is requested by a playback request 204, the creator message data 218 or a link to creator message data 218 is included in the playback data 206 sent to playback interface 114 in response to the request. As a result, the creator message data 218 is presented in playback interface 114 during the subsequent playback of the media item.

Figure 2B:
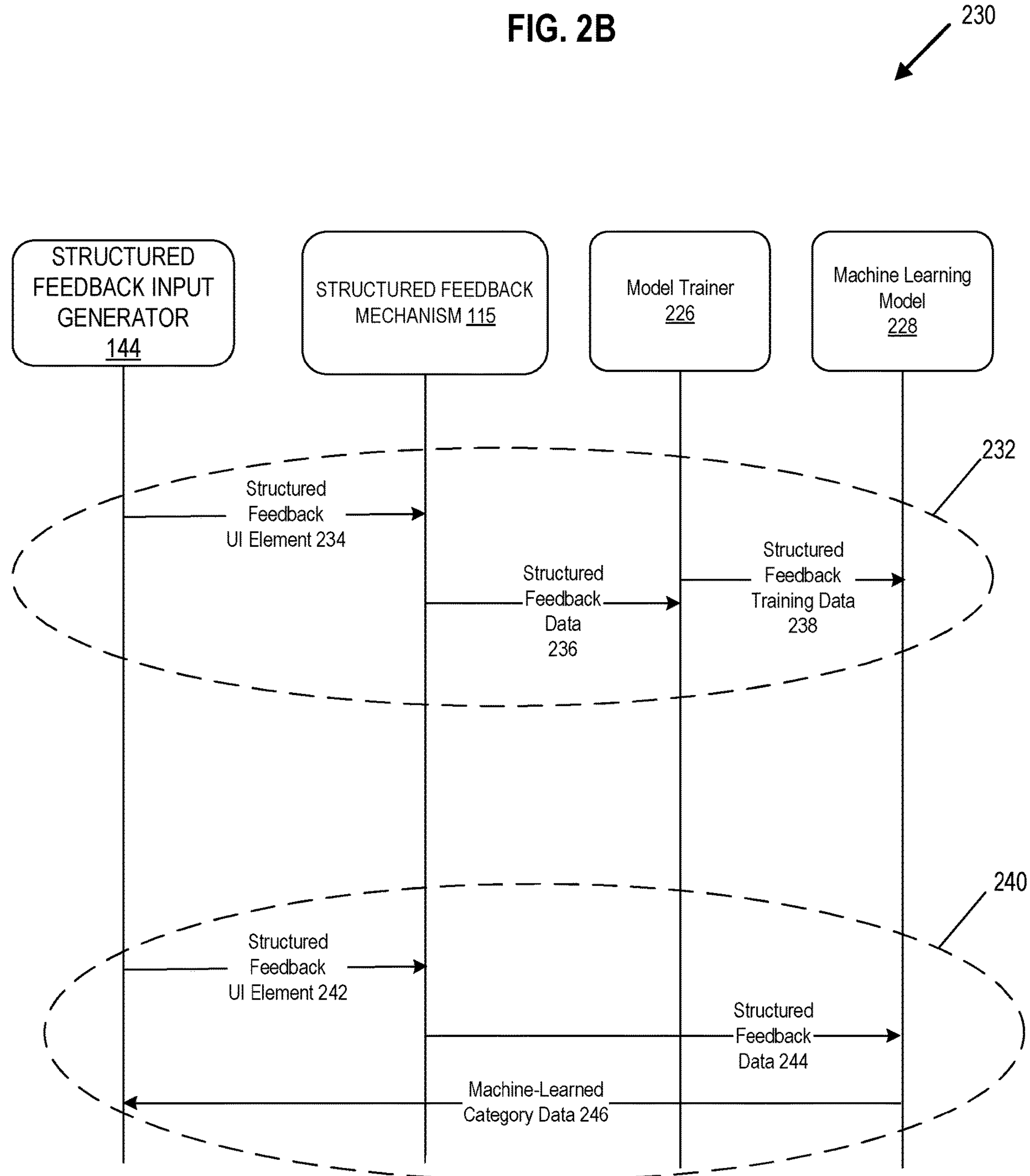
FIG. 2B is a timing diagram of an example method 230 for generating and processing structured feedback in accordance with some embodiments of the present disclosure.

FIG. 2B is a timing diagram of an example method 230 for generating and processing structured feedback in accordance with some embodiments of the present disclosure.

The method 230 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 230 is performed by various components of the computing system 100 of FIG. 1 including portions of media content management interface 113 and/or portions of media player back end system 142. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, processes can be omitted in various embodiments. Thus, not all processes are required in every embodiment. Other process flows are possible.

In FIG. 2B, the method 230 includes a training process 232 and an inference process 240. Training process 232 is a potentially iterative process for generating structured feedback training data for a machine learning model. The process 232 is used by machine learning system 220 of FIG. 2A. e.g., during a training phase of the machine learning model operated by a model trainer 226 of machine learning system 220. Inference process 240 is a potentially iterative process of using a trained machine learning model 228 of machine learning system 220 to generate portions of label data 215 of FIG. 2A. e.g., machine-learned category data 246.

In training process 232, structured feedback input generator 144 provides one or more structured feedback UI elements 234 to structured feedback mechanism 115. Structured feedback mechanism 115 receives structured feedback data 236 from one or more of the structured feedback UI elements 234 and provides structured feedback data 236 to model trainer 226. Model trainer 226 formulates structured feedback training data 238 based on structured feedback data 236. For example, model trainer 226 creates an instance of structured feedback training data 238 by extracting one or more features from structured feedback data 236 and associating a label with the extracted feature(s) to create a feedback data-label pair. An example of a training sample includes a feedback category and an indication, such as the binary value of one, that the category was included in the received structured feedback data 236, e.g., [Feedback-Data, Disagree, 1] or [Feedback-Data, #settings, 1].

In some implementations, a statistical model learns statistical correlations between feedback labels and media segments/timeframes without using any supervised machine learning training methods. For example, based on historical user interaction data including user selections of hashtags during media playback, the hashtag #settings could have a high (e.g., 0.83) probability of being user-selected at a certain timeframe during playback of a certain media item, and a lower (e.g., 0.71 or 0.54) probability of being user-selected on adjacent timeframes. The probability may continue to decrease for subsequent timeframes that are farther away from the time frame at which the user selection occurred. Based on the number of user feedback submissions received at a given timeframe and the number of times a particular feedback label is selected at the timeframe, a ratio of label selections to total selections can be computed for each timeframe.

Model trainer 226 applies a machine learning algorithm, e.g., a linear regression or logistic regression algorithm, to structured feedback training data 238. For example, machine learning system 220 can include multiple different binary classifiers each trained using supervised machine learning to recognize feedback data that contains or does not correlate with a specific type of hashtag or a specific category of feedback.

After multiple iterations of process 232 on multiple different instances of structured feedback training data 238, model trainer 226 applies the trained machine learning model 228 to unlabeled feedback data, e.g., a validation data set, and evaluates the results. Model trainer 226 adjusts one or more model parameters based on the evaluation of results, as needed, until the machine learning model output converges or satisfies one or more validation criteria. An example of a validation criteria is an error, e.g., a quantification of the difference between the output produced by the machine learning model and the expected output. Once the validation criteria has been satisfied, for example, an error value falls below a threshold, the model trainer 226 can designate the trained machine learning model 228 for use by the inference process 240. During the training process 232, machine learning model 228 does not provide machine-learned category data to structured feedback input generator 144.

In the inference process 240, structured feedback input generator 144 provides one or more feedback UI elements 242 to structured feedback mechanism 115. In response to the elements 242, structured feedback mechanism 115 receives unlabeled structured feedback data 244 and applies the trained machine learning model 228 to the unlabeled structured feedback data 244. The trained machine learning model 228 generates machine-learned category data 246, such as suggested hashtags or category labels, and provides the machine-learned category data 246 to structured feedback input generator 144. Structured feedback input generator 144 may use the machine-learned category data 246 to generate and provide one or more additional UI elements 234 to structured feedback mechanism 115.

The method 230 can alternate between the training process 232 and the inference process 240, for example as new feedback data is received or to configure a machine learning model for a particular use case, such as online learning.

In other implementations, a machine learning (ML)-based approach is used to generate hashtags in different situations as follows: in a first situation, a user clicks a "Timebound Feedback" button on a video segment that has no or very few feedback messages associated with it by other users, such that the historical amount of feedback on the segment is not a statistically significant amount to make any hashtags/categorization suggestion based on historical data. In a second situation, a user clicks a "Timebound Feedback" button on a video segment that already contains enough historical feedback data, e.g., other user selections of hashtags/categories that can be used to populate a hashtag suggestion list.

In the first situation, even with the lack of hashtags statistics collected for the video, hashtags/categories suggestions can still be generated using, for example, one or more natural language processing (NLP) techniques such as voice to text recognition, key phrases/entity recognition, or named entity recognition. Voice-to-text recognition can be used to convert speech contained in an audio track of a video into subtitles, and the hashtag/category suggestions can be extracted from a text transcript of the subtitles. Key phrases/entity recognition can be used to identify or extract key phrases from natural language text such as a user's comment on a video segment. For instance, if the viewing user's input on a video segment is a comment, "I do not see how splitting this into multiple layers could be helpful. Maybe you could use a simple embedded formula instead," the key phrase/ entity recognition component could identify and output key phrases from the user's input such as "multiple layers" and "embedded formula" and generate hashtag/category suggestions based on those key phrases. As another example, named entities recognition can be used to extract keywords from unstructured text, such as user feedback in the form of natural language text, and categorize the extracted keywords by, e.g., semantic type, such as organization, product, address, skill, quantity. The semantic types output by the named entity recognition component can be used to generate hashtag/category labels for the user's feedback. Examples of NLP tools that can be used to implement one or more of the above-described hashtag/category generation approaches include but are not limited to pre-trained generative models that are accessible via an inference API, such as large language models.

In the first situation, (where there is insufficient historical data) an example implementation can include offline and online steps, as follows:

Offline Data Preparation Steps

1. A media creator uploads a multimedia content item, such as an educational video. If the media file contains subtitles (either embedded or in a separate file), then step 2 below is skipped and the process moves to step 3.
2. If the media file does not contain subtitles, the system generates subtitles, e.g., by applying voice to text recognition to the media file.
3. The system generates a list of prospect hashtags using one or more of the techniques mentioned above for identifying key phrases and named entities, or other similar algorithms, and binds all generated hashtags to the respective video segments based on the playback time.

Online User Interaction Steps

1. While the media file is playing, the user viewing the media file clicks on the feedback button. When the feedback button is selected, the system determines and stores the playback time (e.g., timestamp) associated with the video segment being played at the moment of the click. For example the system stops or pauses playback of the media file in response to the viewing user's click on the feedback button, and records the associated timestamp. Also, when the feedback button is selected, a dialog window is opened and displayed on the user interface, into which the viewing user can input feedback in the form of, e.g., natural language text. Based on the timestamp associated with the click on the feedback button, the media player searches a data store of the pre-generated hashtags (generated via the offline process described above, for example) that are closest in time to the timestamp.
2. In some implementations, the media player displays the hashtags that are relevant to the selected timestamp in response to the opening of the dialog window. In these implementations, the list of suggested hashtags are determined and displayed to the viewing user, e.g., in the dialog window, solely based on the timestamp at which the media player stopped or paused the playback in response to the selection of the feedback button by the viewing user.
3. In other implementations, the list of suggested hashtags is created but display of the suggested hashtags is deferred. In these implementations, the list of suggested hashtags is pruned or reconfirmed based on the input received by the dialog window from the viewing user. For example, while the viewing user is entering input into the dialog window, a lemmatization algorithm is applied to the user's input, e.g., after each keystroke, over the list of suggested hashtags generated as described above. The list of suggested hashtags is pruned by removing hashtag entries that do not match the user's input.

An example of the above process is as follows. A viewing user uses a media player to watch an educational video on how to use formulas in a spreadsheet program. The user tries to follow the instructions in the video for building a sum formula for a group of cells, but it does not work: the selection of the group of cells is gone once the user points cursor to the formula bar. As a result, the user clicks the feedback button while watching the segment of the video that is explaining how to calculate a sum for a group of cells in the spreadsheet program.

When the feedback dialog windows is open, the media player sends a request to the backend to collect a list of relevant hashtags based on only the current video elapsed time, e.g., at time 4:45. The media player backend receives the video identifier and the timestamp associated with the click on the feedback button, e.g., 4:45. The backend retrieves from storage the pre-generated hashtags that are map to the timestamp, and generates a score for each hashtag in the list, such as a uniqueness score. Using the above example, hashtags are assigned a lower score if they are more commonly used throughout the video, such as general terms like #Spreadsheet, #cell, #formula, #mouse, etc. Hashtags are assigned a higher score if they are only used in the specific portion of video being played, e.g., #sum, #selection, #selectionOfGroup. In other words, hashtags are ranked based on relevance or uniqueness to the particular selected segment, i.e., the video segment playing at the time the feedback button is pressed. An example of a pruned hashtag list including scores is: {#sum: 0.87, #selectionOfGroup: 0.81, . . . , cell: 0.2. #ExcelSpreadsheet: 0.18}.

In some implementation, the pruned hashtag list is sent to the media player front end to display, sorting in rank order by their respective scores. In other implementation, the hashtag list is stored, either on a front end or a backend of the media player, until a trigger event occurs that triggers the display. Using the above example, hashtags are retrieved from the stored list when the viewing user starts typing feedback into the dialog window, e.g., "When I type 'sum' into the Excel's formula bar, the cells selection is removed." While user continues typing feedback, the user's input continues being submitted to the backend for hashtag suggestion generation. In some implementations, machine learning techniques like words tokenization and skip-gram (finding similar words) are used in order to return the most relevant list of hashtags based on the user's input so far. Using the above example, the machine learning-based technique returns suggested hashtags such as #sum, #formula, #formulaBar, #cellsSelection. Tags like #remove, #Excel, #cell will likely be skipped or omitted from the hashtag list, since they are likely to commonly occur across many segments of the video or across many different videos, as opposed to being specific to the selected segment.

In some implementations, the media player backend runs key phrase/entity extraction algorithms directly based on the user's input received by the dialog window, and builds hashtags based on that input. Using the above example, if the user keeps typing: " . . . . I think it's the Excel version glitch," the system can supplement the previously-generated hashtag list with additional tags created based on the user's subsequent input, e.g., #version and #glitch, though these terms are not mentioned in the video script. That is, either or both of the video transcript and the user's feedback input can be used to generate hashtags.

Once the list of suggested hashtags is displayed, the user can select one or more of the suggested hashtags that are most relevant to the user's feedback, e.g., #formulaBar, #sum, #cellsSelection. A user selection of a hashtag adds the hashtag to the user's feedback input before the feedback is submitted to the back end.

In the second situation, when adequate historical examples of user feedback on the same timeframe are available, a similar approach as described above can be used, except that the hashtag scores are adjusted based on the historical examples of user feedback. Using the above example, if a first user, user1, submits feedback on the timeframe 4:45 that includes #glitch as a hashtag, the system determines whether to add #glitch to the predefined list of suggested hashtags list for a subsequent user, user2, who views the same media file and leaves feedback at the same timeframe. As another example, if user1 submits feedback on the timeframe 4:45 that includes the hashtag #sum but not #selectionOfGroup, the scores for those hashtags are adjusted based on user1's selections; for example #sum: 0.87 is adjusted to 0.92 (increased), #selectionOfGroup: 0.81 is adjusted to 0.78 (decreased). In this way, the scores for the individual hashtags are adjusted over time as more feedback is received from a population of users viewing the media file.

Figure 2C:
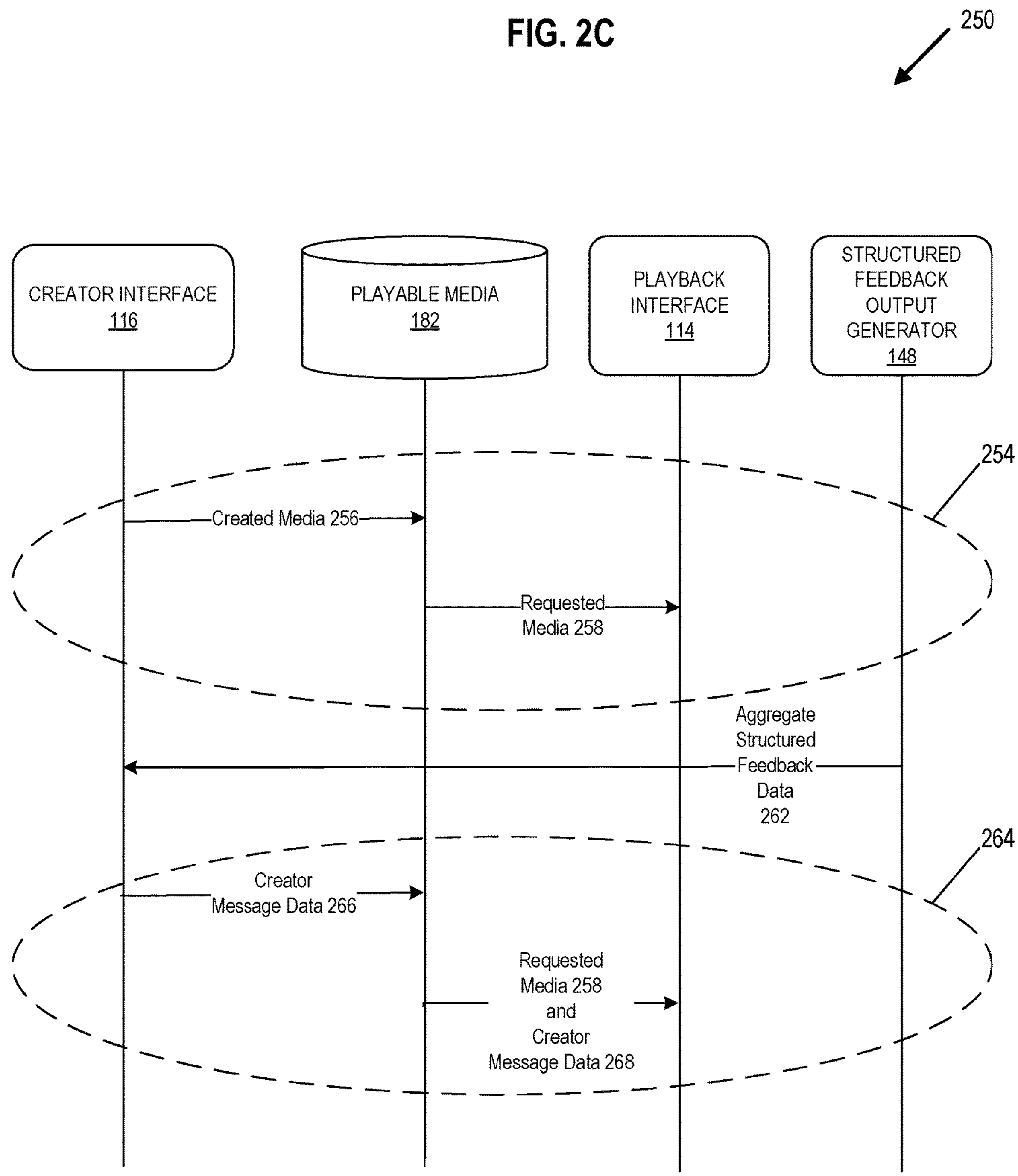
FIG. 2C is a timing diagram of an example method 250 for generating and processing structured feedback in accordance with some embodiments of the present disclosure.

FIG. 2C is a timing diagram of an example method 250 for generating and processing structured feedback in accordance with some embodiments of the present disclosure.

The method 250 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 250 is performed by various components of the computing system 100 of FIG. 1 including portions of media content management interface 113 and/or portions of media player back end system 142. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, processes can be omitted in various embodiments. Thus, not all processes are required in every embodiment. Other process flows are possible.

In FIG. 2C, the method 250 includes a first playback process 254 and a second playback process 264. In the first playback process 254, a creator operating a user system 110 executing creator interface 116 uploads and publishes created media 256 to the media player back end system 142. The media player back end system 142 stores the created media 256 in playable media 182. At any time after the created media 256 is published, any one or more users operating user systems 110 executing playback interface 114 can request the published media from the media player back end system 142. The back end system 142 provides the requested media 258 to the requesting one or more playback interfaces 114. Any one or more of the users viewing the requested media 258 can generate structured feedback through the structured feedback mechanism of playback interface 114. For example, hundreds or thousands of viewing users can generate structured feedback on different segments of the requested media 258 at the same time or at different times. Structured feedback output generator 148 aggregates the various feedback and provides the aggregate feedback to creator interface 116.

An example of how structured feedback output generator 148 aggregates feedback is as follows. In some implementations, a set of alternative, mutually exclusive high-level feedback categories/labels are pre-defined and the media player front end system enforces the pre-defined labels by requiring the viewing user to select one, but not more than one, of the alternative labels. For example, the front end system requires the user to select either the "I do not understand" label OR the "I disagree" label. FIG. 5A illustrates an example of aggregation by timestamp of such categories without reference to any user-entered text or user-selected hashtags. For instance, structured feedback output generator 148 counts the number of times viewing uses select the "I do not understand" label over the entire media item (e.g., FIG. 5A) and/or for each timestamp or timeframe during playback of the media item (e.g., FIG. 5B).

In other examples, when the viewing user inputs unstructured text feedback, the user is allowed to choose tags from a system-generated list of suggested hashtags, or the user can enter their own hashtags, alternatively or in addition to selecting a pre-defined high level category as in FIG. 5A. In those examples, aggregation is performed for each pre-defined high level category and also, optionally, for each tag selected or input by the viewing users. Thus, it is possible that the aggregation may include a number of feedback labels that only have a count of one (e.g., if only one user entered or selected each of those labels). However, this information still can be valuable to the creator of the media item because those instances of feedback can provide more detailed feedback on the media item or on particular time segments of the media item than the pre-defined feedback categories.

In other words, embodiments of the system can enable aggregation of structured feedback at multiple different levels of granularity by generating different visual representations of the feedback (e.g., charts) for each level of granularity. For instance, a first chart can display aggregations of the pre-defined labels or categories, which can represent high-level intentions of the users submitting feedback; a second chart can display aggregations of user selections of suggested hashtags, which can represent a more specific categorization or summarization of the user's unstructured (e.g., natural language) feedback, and further, a third chart can display aggregations of user-created hashtags, which can represent categorizations or summarizations of that are more personal or customized to specific users.

To illustrate with an example, suppose two users view the same video via their respective user devices. Suppose the first user 1 chooses the pre-defined label, "I do not understand," and user 1 also enters unstructured text and tags the unstructured text with #utc and #timezone. Suppose the second user 2 leaves feedback around the same time segment as the segment at which user 1 left feedback, except that user 2 selects the pre-defined label, "I do not understand" and user 2 also selects or enters the tags #timezone and #timeshift. In this case, using the example of FIG. 5A, a first aggregation chart would display a count of two feedback items categorized as "I do not understand" because both user 1 and user 2 selected the pre-defined label "I do not understand.").

Using the example of FIG. 5B, a second aggregation chart would display a count of two feedback items for the tag #timezone, a count of one feedback item for the tag #utc, and a count of one feedback item for the tag #timeshift: 1. In this example, the tag #timezone would be displayed in the first position at the top of the second aggregation chart because it is the most frequently selected tag out of all of the selected tags. Many other different aggregations of the various types of structured feedback are possible and the system can be configured according to the requirements of a particular design or implementation. For example, the pre-defined high-level categories need not be limited to two alternative categories. Rather, the number of pre-defined high-level categories over which aggregations are performed can be greater than two or even one, in some implementations (for instance, if the creator is only interested in identifying segments that the users do not understand or disagree with).

In the second playback process 264, the creator of the created media 256 receives and processes the aggregate structured feedback data 262 through creator interface 116 and generates creator message data 266. Creator interface 116 associates creator message data 266 with the created media 256, e.g., by appending a media identifier associated with the created media 256 to the creator message data 266. Creator interface 116 sends the creator message data 266 to the media player back end system 142.

Media player back end system 142 stores the creator message data 266 in association with the created media 256 in playable media 182. After the creator message data 266 is stored in association with the created media 256, when the media player back end system 142 receives a playback request from one or more playback interfaces 114, the back end system 142 includes the creator message data 268 along with the requested media 258 in the response to the playback request, such that the creator message data 268 is played in the playback interface 114 along with the requested media 258.

Figure 6:
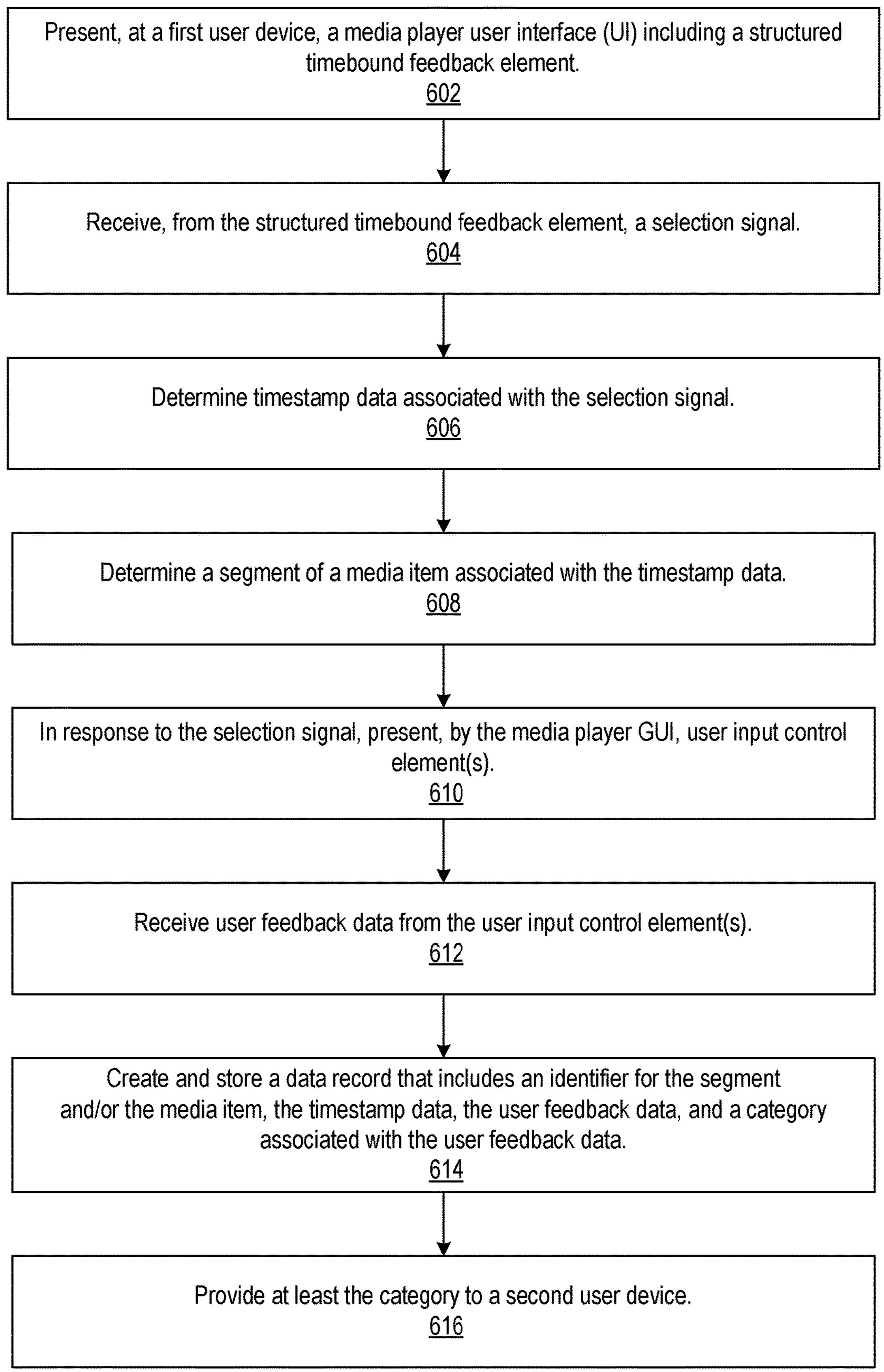
FIG. 6 is a flow diagram of an example method 600 to implement a structured feedback mechanism in accordance with some embodiments of the present disclosure.

FIG. 6 is a flow diagram of an example method 600 to implement a structured feedback mechanism in accordance with some embodiments of the present disclosure.

The method 600 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by portions of media content management interface 113 and/or portions of media player back end system 142 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 602, the processing device presents, at a first user device, a media player user interface (UI) including a structured timebound feedback element. Operation 602 is performed, for example, by media content management interface 113, described above, in communication with structured feedback input generator 144 of media player back end system 142, described above.

In some implementations, the media player UI is a graphical user interface. In some implementations, the media player UI includes a playback window, at least one playback control element, and the structured timebound feedback control element. A media item is played in the media player UI at the first user device. In some implementations, the media player UI includes an elapsed playback time indicator and the media player UI presents the structured timebound feedback control element adjacent to the elapsed playback time indicator. In some implementations, the media player UI presents at least one selectable label or at least one selectable hashtag. In some implementations, the media player UI presents at least two alternatively selectable feedback category labels. The at least two alternatively selectable feedback category labels can include at least one of comment, question, clarification, request, reaction, agree, or disagree. In some implementations, the media player UI is presented by an online learning software application or an online education software application. In some implementations, the structured timebound feedback element is registered with the media player UI at the first user device.

In some implementations, a machine learning model is applied to an input that includes the selection signal and/or the user feedback data, where the machine learning model is trained to determine correlations between selection signals and/or user feedback data and suggested feedback categories and/or hashtags, and the machine learning model generates at least one suggested feedback category and/or at least one suggested hashtag.

At operation 604, the processing device receives, from the structured timebound feedback element, a selection signal. Operation 604 is performed, for example, by structured feedback processor 146, described above, in communication with playback interface 114, described above.

At operation 606, the processing device determines timestamp data associated with the selection signal received at operation 604. Operation 606 is performed, for example, by structured feedback processor 146, described above. In some implementations, determining the timestamp data includes receiving, from the media player UI, a stop playback signal and/or a pause playback signal, and determining an elapsed playback time associated with the stop playback signal and/or the pause playback signal.

At operation 608, the processing device determines a segment of a media item associated with the timestamp data. Operation 608 is performed, for example, by structured feedback processor 146, described above, in communication with playback interface 114, described above.

At operation 610, the processing device, in response to the selection signal received at operation 604, presents, by the media player UI, one or more user input control elements. In some implementations, the user input control elements include at least two selectable feedback categories and at least one text input element. Operation 610 is performed, for example, by structured feedback input generator 144, described above, in communication with structured feedback mechanism 115 of playback interface 114, described above.

At operation 612, the processing device receives user feedback data from the user input control element(s) presented at operation 610. Operation 612 is performed, for example, by structured feedback processor 146, described above, in communication with structured feedback mechanism 115 of playback interface 114, described above. In some implementations, the user feedback data includes a feedback category selection and text associated with the feedback category selection. In some implementations, the user feedback data includes at least one label selection or at least one hashtag selection.

At operation 614, the processing device creates and stores a data record that includes an identifier for the segment and/or the media item, the timestamp data, the user feedback data, and a category associated with the user feedback data.

Operation 614 is performed, for example, by structured feedback processor 146, described above, in communication with structured feedback mechanism 115 of playback interface 114, described above.

At operation 616, the processing device provides at least the category stored in the data record created at operation 614 to a second user device. In some implementations, the category and other portions of the user feedback data are sent to the second user device. In some implementations, the second user device is operated by a creator of the media item played in the media player UI at the first user device. Operation 616 is performed, for example, by structured feedback output generator 148, described above, in communication with structured feedback processor 146, described above.

In some implementations, timestamp data and associated user feedback data are received from multiple users, e.g., a population of viewing users, of the same media item over a time interval, and the feedback from the population of users is aggregated based on, for example, feedback category. For instance, additional timestamp data and additional user feedback data are received from the media player UI at the first user device and/or at least one other media player UI of at least one other user device, and the additional timestamp data is included in at least one additional data record that is created and stored. In some implementations, aggregate user feedback data for the media item and/or the segment played at the first user device is created based on the timestamp data and the additional timestamp data, by aggregating the user feedback data of the data record and user feedback data of the at least one additional data record (e.g., multiple instances of user feedback) according to the feedback category, which may be determined at operation 614, described above. In some implementations, the method 600 includes generating a graphical representation of the aggregate user feedback data, and providing the graphical representation of the aggregate user feedback data to the second user device, for example, the creator's device.

In some implementations, the method 600 includes receiving, from the second device, creator message data, storing an association between the creator message data and at least one of the media item or the segment, receiving a second selection signal from the first user device, and providing the creator message data to the first user device.

In some implementations, the method 600 includes, in response to the user feedback data, executing a downstream action that includes one or more of: presenting, by the media player UI, at least one additional user input control element; receiving additional user feedback data; presenting, by the media player UI, at least one of a selectable label or a selectable hashtag; receiving an electronic communication from the second user device; associating at least one electronic communication received from the second user device with at least one of the media item, the segment, or the data record; generating a report of aggregate user feedback data; or storing the data record.

FIG. 7 is a block diagram of an example computer system 700 including a media player system 750 in accordance with some embodiments of the present disclosure. The media player system 750 includes portions of media content management interface 113 and/or portions of media player back end system 142. In FIG. 7, an example machine of a computer system 700 is shown, within which a set of instructions, for causing the machine to perform any of the methodologies discussed herein, can be executed. In some embodiments, the computer system 700 can correspond to a component of a networked computer system (e.g., as a component of the computing system 100 of FIG. 1) that includes, is coupled to, or utilizes a machine to execute an operating system to perform operations corresponding to portions of media content management interface 113 and/or portions of media player back end system 142 of FIG. 1. For example, computer system 700 corresponds to a portion of a user system 110 when the user system 110 is executing media content management interface 113, and computer system 700 corresponds to a portion of application software system 130 and/or online media hosting service 140 when the application software system 130 and/or online media hosting service 140 is executing media player back end system 142.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a memory 706 (e.g., flash memory, static random access memory (SRAM), etc.), an input/output system 710, and a data storage system 740, which communicate with each other via a bus 730.

Processing device 702 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be at least one special-purpose processing device such as an application specific integrated circuit (ASIC), a field programmable gate array (FPGA), a digital signal processor (DSP), network processor, or the like. The processing device 702 is configured to execute instructions 712 for performing the operations and steps discussed herein.

In FIG. 7, media player system 750 represents media content management interface 113 when the user system 110 is executing media content management interface 113, and media player system 750 represents media player back end system 142 when the application software system 130 and/or online media hosting service 140 is executing media player back end system 142. Instructions 712 include portions of media player system 750 when those portions of the media player system 750 are being executed by processing device 702. Thus, similar to the description above, the media player system 750 is shown in dashed lines as part of instructions 712 to illustrate that, at times, portions of the media player system 750 are executed by processing device 702. For example, when at least some portion of the media player system 750 is embodied in instructions to cause processing device 702 to perform the method(s) described above, some of those instructions can be read into processing device 702 (e.g., into an internal cache or other memory) from main memory 704 and/or data storage system 740. However, it is not required that all of the media player system 750 be included in instructions 712 at the same time and portions of the media player system 750 are stored in at least one other component of computer system 700 at other times, e.g., when at least one portion of the media player system 750 are not being executed by processing device 702.

The computer system 700 further includes a network interface device 708 to communicate over the network 720. Network interface device 708 provides a two-way data communication coupling to a network. For example, network interface device 708 can be an integrated-services digital network (ISDN) card, cable modem, satellite modem, or a modem to provide a data communication connection to a corresponding type of telephone line. As another example, network interface device 708 can be a local area network (LAN) card to provide a data communication connection to a compatible LAN. Wireless links can also be implemented. In any such implementation network interface device 708 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 700.

Computer system 700 can send messages and receive data, including program code, through the network(s) and network interface device 708. In the Internet example, a server can transmit a requested code for an application program through the Internet and network interface device 708. The received code can be executed by processing device 702 as it is received, and/or stored in data storage system 740, or other non-volatile storage for later execution.

The input/output system 710 includes an output device, such as a display, for example a liquid crystal display (LCD) or a touchscreen display, for displaying information to a computer user, or a speaker, a haptic device, or another form of output device. The input/output system 710 can include an input device, for example, alphanumeric keys and other keys configured for communicating information and command selections to processing device 702. An input device can, alternatively or in addition, include a cursor control, such as a mouse, a trackball, or cursor direction keys for communicating direction information and command selections to processing device 702 and for controlling cursor movement on a display. An input device can, alternatively or in addition, include a microphone, a sensor, or an array of sensors, for communicating sensed information to processing device 702. Sensed information can include voice commands, audio signals, geographic location information, and/or digital imagery, for example.

The data storage system 740 includes a machine-readable storage medium 742 (also known as a computer-readable medium) on which is stored at least one set of instructions 744 or software embodying any of the methodologies or functions described herein. The instructions 744 can also reside, completely or at least partially, within the main memory 704 and/or within the processing device 702 during execution thereof by the computer system 700, the main memory 704 and the processing device 702 also constituting machine-readable storage media.

In one embodiment, the instructions 744 include instructions to implement functionality corresponding to a media player (e.g., the media content management interface 113 and/or media player back end system 142 of FIG. 1).

Dashed lines are used in FIG. 7 to indicate that it is not required that the media player be embodied entirely in instructions 712, 714, and 744 at the same time. In one example, portions of the media player are embodied in instructions 744, which are read into main memory 704 as instructions 714, and portions of instructions 714 are read into processing device 702 as instructions 712 for execution. In another example, some portions of the media player are embodied in instructions 744 while other portions are embodied in instructions 714 and still other portions are embodied in instructions 712.

While the machine-readable storage medium 742 is shown in an example embodiment to be a single medium, the term "machine-readable storage medium" should be taken to include a single medium or multiple media that store the at least one set of instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the above-described computer-implemented methods in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In an example 1, a method includes receiving a first selection signal from a first media player of a first user device; based on the first selection signal, determining first timestamp data, where the first timestamp data is associated with a first segment of a media item played by the first media player; receiving first user feedback from the first media player, where the first user feedback relates to at least one of the first segment or the media item; based on the first timestamp data, creating a first structured representation of the first user feedback, where the first structured representation includes a first feedback category; and creating and storing a first data record including the first feedback category.

An example 2 includes the subject matter of example 1, further including: receiving second user feedback from at least one second media player of at least one second user device where the second user feedback relates to at least one of the first segment or the media item; creating a structured representation of the second user feedback; creating and storing at least one second data record including the structured representation of the second user feedback; and creating aggregate user feedback by aggregating the structured representation of the first user feedback and the structured representation of the second user feedback. An example 3 includes the subject matter of example 2, further including: generating a graphical representation of the aggregate user feedback; and providing the graphical representation of the aggregate user feedback to a third user device different from the first user device and the at least one second user device. An example 4 includes the subject matter of any of examples 1-3, where creating the first structured representation of the first user feedback includes receiving, from the first media player, a selection of at least one a label related to the first feedback category. An example 5 includes the subject matter of any of examples 1-4, where creating the first structured representation of the first user feedback includes receiving, from the first media player, a selection of at least one machine-suggested hashtag related to the first feedback category. An example 6 includes the subject matter of any of examples 1-5, further including: based on at least one of the first timestamp data or the first user feedback, generating at least one recommendation, where the at least one recommendation includes a machine-generated hashtag; causing the first media player to present the at least one recommendation via the first user device; and receiving, from the first media player, a selection of a recommendation of the at least one recommendation. An example 7 includes the subject matter of any of examples 1-6, where creating the first structured representation of the first user feedback includes receiving a selection of a label from at least two alternatively selectable labels. An example 8 includes the subject matter of any of examples 1-7, where the first feedback category includes at least one of comment, question, clarification, request, reaction, agree, or disagree. An example 9 includes the subject matter of any of examples 1-8, where determining the first timestamp data includes (i) receiving, from the first media player, at least one of a stop playback signal or a pause playback signal, and (ii) determining an elapsed playback time associated with at least one of the stop playback signal or the pause playback signal and the media item. An example 10 includes the subject matter of any of examples 1-9, further including, in response to receiving the first user feedback, executing a downstream action including at least one of: causing the first media player to present at least one additional user input control element; receiving second user feedback data; causing the first media player to present at least one of a selectable label or a selectable hashtag at the first user device; sending the first structured representation of the first user feedback to a second user device different from the first user device; receiving an electronic communication from the second user device in response to the first user feedback; linking at least one electronic communication received from the second user device in response to the first user feedback with at least one of the media item, the first segment, or the first data record; or generating a report of aggregate user feedback.

In an example 11, a system, includes: at least one processor; and at least one memory coupled to the at least one processor, where the at least one memory includes instructions that when executed by the at least one processor cause the at least one processor to perform operations including: receiving a first selection signal from a first media player of a first user device; based on the first selection signal, determining first timestamp data, where the first timestamp data is associated with a first segment of a media item played by the first media player; receiving first user feedback from the first media player, where the first user feedback relates to at least one of the first segment or the media item; based on the first timestamp data, creating a first structured representation of the first user feedback, where the first structured representation includes a first feedback category; and creating and storing a first data record including the first feedback category.

An example 12 includes the subject matter example 11, where the instructions, when executed by the at least one processor, cause the at least one processor to perform operations further including: receiving second user feedback from at least one second media player of at least one second user device where the second user feedback relates to at least one of the first segment or the media item; creating a structured representation of the second user feedback; creating and storing at least one second data record including the structured representation of the second user feedback; and creating aggregate user feedback by aggregating the structured representation of the first user feedback and the structured representation of the second user feedback. An example 13 includes the subject matter of example 12, where the instructions, when executed by the at least one processor, cause the at least one processor to perform operations further including: generating a graphical representation of the aggregate user feedback; and providing the graphical representation of the aggregate user feedback to a third user device different from the first user device and the at least one second user device. An example 14 includes the subject matter of any of examples 1-13, where creating the first structured representation of the first user feedback includes receiving, from the first media player, a selection of at least one label related to the first feedback category. An example 15 includes the subject matter of any of examples 1-14, where creating the first structured representation of the first user feedback includes receiving, from the first media player, a selection of at least one machine-suggested hashtag related to the first feedback category. An example 16 includes the subject matter of any of examples 1-15, where the instructions, when executed by the at least one processor, cause the at least one processor to perform operations further including: based on at least one of the first timestamp data or the first user feedback, generating at least one recommendation, where the at least one recommendation includes a machine-generated hashtag; causing the first media player to present the at least one recommendation via the first user device; and receiving, from the first media player, a selection of a recommendation of the at least one recommendation. An example 17 includes the subject matter of any of examples 1-16, where creating the first structured representation of the first user feedback includes receiving a selection of a label from at least two alternatively selectable labels. An example 18 includes the subject matter of any of examples 1-17, where the first feedback category includes at least one of comment, question, clarification, request, reaction, agree, or disagree. An example 19 includes the subject matter of any of examples 1-18, where determining the first timestamp data includes (i) receiving, from the first media player, at least one of a stop playback signal or a pause playback signal, and (ii) determining an elapsed playback time associated with at least one of the stop playback signal or the pause playback signal and the media item. An example 20 includes the subject matter of any of examples 1-19, where the instructions, when executed by the at least one processor, cause the at least one processor to perform operations further including, in response to receiving the first user feedback, executing a downstream action including at least one of: causing the first media player to present at least one additional user input control element; receiving second user feedback data; causing the first media player to present at least one of a selectable label or a selectable hashtag at the first user device; sending the first structured representation of the first user feedback to a second user device different from the first user device; receiving an electronic communication from the second user device in response to the first user feedback; linking at least one electronic communication received from the second user device in response to the first user feedback with at least one of the media item, the first segment, or the first data record; or generating a report of aggregate user feedback.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

generating correlations of feedback labels and media segment timeframes, wherein a correlation comprises a probability of a feedback label being user-selected at a certain timeframe during playback of a certain media item;

receiving a first selection signal from a first media player of a first user device;

based on the first selection signal, determining first timestamp data, wherein the first timestamp data is associated with a first segment of a media item played by the first media player;

receiving first user feedback from the first media player, wherein the first user feedback relates to at least one of the first segment or the media item;

creating a first structured representation of the first user feedback, wherein the first structured representation comprises a first feedback category determined using the first timestamp data and the correlations of feedback labels and media segment timeframes; and creating and storing a first data record comprising the first feedback category.

2. The method of claim 1, further comprising:

receiving second user feedback from at least one second media player of at least one second user device wherein the second user feedback relates to at least one of the first segment or the media item;

creating a structured representation of the second user feedback;

creating and storing at least one second data record comprising the structured representation of the second user feedback; and creating aggregate user feedback by aggregating the structured representation of the first user feedback and the structured representation of the second user feedback.

3. The method of claim 2, further comprising:

generating a graphical representation of the aggregate user feedback; and providing the graphical representation of the aggregate user feedback to a third user device different from the first user device and the at least one second user device.

4. The method of claim 1, wherein creating the first structured representation of the first user feedback comprises receiving, from the first media player, a selection of at least one label related to the first feedback category.

5. The method of claim 1, wherein creating the first structured representation of the first user feedback comprises receiving, from the first media player, a selection of at least one machine-suggested hashtag related to the first feedback category.

6. The method of claim 1, further comprising:

based on at least one of the first timestamp data or the first user feedback, generating at least one recommendation, wherein the at least one recommendation comprises a machine-generated hashtag;

causing the first media player to present the at least one recommendation via the first user device; and receiving, from the first media player, a selection of a recommendation of the at least one recommendation.

7. The method of claim 1, wherein creating the first structured representation of the first user feedback comprises receiving a selection of a label from at least two alternatively selectable labels.

8. The method of claim 1, wherein the first feedback category comprises at least one of comment, question, clarification, request, reaction, agree, or disagree.

9. The method of claim 1, wherein determining the first timestamp data comprises (i) receiving, from the first media player, at least one of a stop playback signal or a pause playback signal, and (ii) determining an elapsed playback time associated with at least one of the stop playback signal or the pause playback signal and the media item.

10. The method of claim 1, further comprising, in response to receiving the first user feedback, executing a downstream action comprising at least one of:

causing the first media player to present at least one additional user input control element;

receiving second user feedback data;

causing the first media player to present at least one of a selectable label or a selectable hashtag at the first user device;

sending the first structured representation of the first user feedback to a second user device different from the first user device;

receiving an electronic communication from the second user device in response to the first user feedback;

linking at least one electronic communication received from the second user device in response to the first user feedback with at least one of the media item, the first segment, or the first data record; or generating a report of aggregate user feedback.

11. A system, comprising:

at least one processor; and at least one memory coupled to the at least one processor, wherein the at least one memory comprises instructions that when executed by the at least one processor cause the at least one processor to perform operations comprising:

generating correlations of feedback labels and media segment timeframes, wherein a correlation comprises a probability of a feedback label being user-selected at a certain timeframe during playback of a certain media item;

receiving a first selection signal from a first media player of a first user device;

based on the first selection signal, determining first timestamp data, wherein the first timestamp data is associated with a first segment of a media item played by the first media player;

receiving first user feedback from the first media player, wherein the first user feedback relates to at least one of the first segment or the media item;

creating a first structured representation of the first user feedback, wherein the first structured representation comprises a first feedback category determined using the first timestamp data and the correlations of feedback labels and media segment timeframes; and creating and storing a first data record comprising the first feedback category.

12. The system of claim 11, wherein the instructions, when executed by the at least one processor, cause the at least one processor to perform operations further comprising:

receiving second user feedback from at least one second media player of at least one second user device wherein the second user feedback relates to at least one of the first segment or the media item;

creating a structured representation of the second user feedback;

creating and storing at least one second data record comprising the structured representation of the second user feedback; and creating aggregate user feedback by aggregating the structured representation of the first user feedback and the structured representation of the second user feedback.

13. The system of claim 12, wherein the instructions, when executed by the at least one processor, cause the at least one processor to perform operations further comprising:

generating a graphical representation of the aggregate user feedback; and providing the graphical representation of the aggregate user feedback to a third user device different from the first user device and the at least one second user device.

14. The system of claim 11, wherein creating the first structured representation of the first user feedback comprises receiving, from the first media player, a selection of at least one label related to the first feedback category.

15. The system of claim 11, wherein creating the first structured representation of the first user feedback comprises receiving, from the first media player, a selection of at least one machine-suggested hashtag related to the first feedback category.

16. The system of claim 11, wherein the instructions, when executed by the at least one processor, cause the at least one processor to perform operations further comprising:

based on at least one of the first timestamp data or the first user feedback, generating at least one recommendation, wherein the at least one recommendation comprises a machine-generated hashtag;

causing the first media player to present the at least one recommendation via the first user device; and receiving, from the first media player, a selection of a recommendation of the at least one recommendation.

17. The system of claim 11, wherein creating the first structured representation of the first user feedback comprises receiving a selection of a label from at least two alternatively selectable labels.

18. The system of claim 11, wherein the first feedback category comprises at least one of comment, question, clarification, request, reaction, agree, or disagree.

19. The system of claim 11, wherein determining the first timestamp data comprises (i) receiving, from the first media player, at least one of a stop playback signal or a pause playback signal, and (ii) determining an elapsed playback time associated with at least one of the stop playback signal or the pause playback signal and the media item.

20. The system of claim 11, wherein the instructions, when executed by the at least one processor, cause the at least one processor to perform operations further comprising, in response to receiving the first user feedback, executing a downstream action comprising at least one of:

causing the first media player to present at least one additional user input control element;

receiving second user feedback data;

causing the first media player to present at least one of a selectable label or a selectable hashtag at the first user device;

sending the first structured representation of the first user feedback to a second user device different from the first user device;

receiving an electronic communication from the second user device in response to the first user feedback;

linking at least one electronic communication received from the second user device in response to the first user feedback with at least one of the media item, the first segment, or the first data record; or generating a report of aggregate user feedback.

* * * * *